(12) United States Patent
Smith

(10) Patent No.: US 10,036,174 B2
(45) Date of Patent: Jul. 31, 2018

(54) POOL SKIMMER SYSTEM

(71) Applicant: Totally New Technologies LLC, Goodlettsville, TN (US)

(72) Inventor: Ronnie E. Smith, Goodlettsville, TN (US)

(73) Assignee: Totally New Technologies LLC, Nashville, TN (US)

( * ) Notice: Subject to any disclaimer, the term of this patent is extended or adjusted under 35 U.S.C. 154(b) by 0 days.

(21) Appl. No.: 15/115,356

(22) PCT Filed: Jul. 30, 2014

(86) PCT No.: PCT/US2014/048930
§ 371 (c)(1),
(2) Date: Jul. 29, 2016

(87) PCT Pub. No.: WO2015/116249
PCT Pub. Date: Aug. 6, 2015

(65) Prior Publication Data
US 2017/0175410 A1    Jun. 22, 2017
US 2018/0142484 A9    May 24, 2018

(30) Foreign Application Priority Data

Jan. 29, 2014  (WO) ................ PCT/US2014/013617

(51) Int. Cl.
*E04H 4/12*    (2006.01)
*C02F 1/00*    (2006.01)
*C02F 103/42*  (2006.01)

(52) U.S. Cl.
CPC ......... *E04H 4/1272* (2013.01); *E04H 4/1263* (2013.01); *C02F 1/00* (2013.01); *C02F 2103/42* (2013.01)

(58) Field of Classification Search
CPC ....... E04H 4/1272; E04H 4/1263; C02F 1/00; C02F 2103/42
USPC .......................................... 210/167.1, 167.18
See application file for complete search history.

(56) References Cited

U.S. PATENT DOCUMENTS

| 2,633,989 | A | 4/1953 | Kelly |
| 4,170,047 | A | 10/1979 | Corsette |
| 4,686,728 | A | 8/1987 | Rawlins |
| 4,740,307 | A | 4/1988 | Buelteman |

(Continued)

FOREIGN PATENT DOCUMENTS

WO    2011075790    6/2011

*Primary Examiner* — Fred Prince
(74) *Attorney, Agent, or Firm* — Shane Cortesi

(57) ABSTRACT

The present invention relates to systems for improving the range of pool skimmers. In some embodiments, the present invention provides a weir that is located in the basin of a swimming pool, moves in response to changing water levels in the pool and feeds water from the basin to a skimmer located in a sidewall of the swimming pool. In other embodiments, the present invention provides a deflector that is adjacent to a pool sidewall and extends above the skimmer opening, and includes an opening for feeding water to the skimmer opening. The present disclosure also provides for systems having combinations of such features. Without being bound to any particular theory, it is believed that the apparatuses are relatively cheap to manufacture, safe, conserve water and chemical use, and allow for an aesthetically pleasing full pool.

19 Claims, 35 Drawing Sheets

(56) References Cited

U.S. PATENT DOCUMENTS

| | | | |
|---|---|---|---|
| 5,106,492 A | 4/1992 | Distinti | |
| 5,490,923 A * | 2/1996 | Penney | E04H 4/1254 210/167.18 |
| 6,214,217 B1 | 4/2001 | Sliger, Jr. | |
| 6,393,628 B1 | 5/2002 | Kellogg | |
| 6,409,917 B1 | 6/2002 | Malone, Jr. | |
| 8,202,416 B1 * | 6/2012 | Jones | E04H 4/1272 210/167.18 |
| 2004/0238425 A1 | 12/2004 | Hodak | |
| 2009/0107899 A1 | 4/2009 | Ringenbach | |
| 2010/0032363 A1 | 2/2010 | Happel | |
| 2010/0230336 A1 | 9/2010 | Davies | |

* cited by examiner

POOL SKIMMER SYSTEM

BACKGROUND

Technical Field

The present invention relates to systems for improving the operation of pool skimmers, particularly those used in outdoor swimming pools, and methods of using the same.

Background of the Invention

With reference to FIGS. 1-3, in the prior art, it is known to remove debris in swimming pools 110 through the use of skimmers 100. As known to those of ordinary skill, swimming pools 110 generally consist of a basin (or swimming area) 121, the perimeter of which is defined by a plurality of sidewalls 120 and the bottom of which is defined by a floor 122. The floor 122 usually includes a bottom drain 101.

Skimmers 100 generally include a rectangular skimmer opening 135 located in a sidewall 120 of the swimming pool 110, a moveable skimmer weir 170 located inside the skimmer 100 that pivots on a hinge 155 within the skimmer 100 and moves in response to changes in the water levels of the swimming pool 110 and a rectangular skimmer faceplate 145. The faceplate 145 surrounds the skimmer opening 135, has a thickness 148 of about 1-3 inches and is secured to the pool sidewall 120 via one or more fasteners (e.g., screws) 146 inserted through fastener apertures 147. Some pools, particularly many concrete and gunite pools, lack a faceplate 145 surrounding the skimmer opening 135. The skimmer weir 170 pivots between a vertical position (shown in phantom line 170A in FIG. 2) in which the skimmer weir 170 is generally parallel to the sidewall 120 (and perpendicular to the ground) and prevents large debris from flowing through the skimmer 100 (more precisely, beyond the skimmer weir 170) and a horizontal position (shown in phantom line 170B in FIG. 2) in which the skimmer weir 170 is generally perpendicular to the sidewall 120 (and parallel to the ground) and allows large debris to flow through the skimmer 100 until the debris reaches a filter or debris basket 160. The passageway or throat through which water flows through the skimmer 100 is denoted by numeral 196 and the top of the throat is denoted by 197. As known to the those of ordinary skill, the skimmer weir 170 of a conventional skimmer 100 often occupies a position between its two end pivot points (i.e., between the vertical 170A and horizontal 170B positions), as shown in FIG. 2. Water enters the skimmer 100 through the opening 135, flows through throat 196 and over the skimmer weir 170, and through a filter or debris basket 160, which collects debris. Optionally, the top of the throat 197 includes a downwardly extending flange 198, which prevents the skimmer weir 170 from rotating beyond the vertical 170A. Ultimately, the filtered water exits the skimmer 100 through drain/exit aperture 199 is then pumped back into the basin 121 of the swimming pool 110 through water jets 165 located in the pool sidewalls 120. Pools may include a series of pumps 190, valves 192 and 194 and pipes 180, 181, 182 and 193. Typically the water jets 165 create a counter-clockwise or clockwise 183 circulation in the basin 121 of the pool 110, as shown in FIG. 3. Pools 110 may contain one or more skimmers 100, depending on pool size and the year the pool was built. For example, some U.S. municipalities require that municipal pools have one skimmer per 400 square feet of swimming area.

Usually, the skimmer opening 135 and skimmer weir 170 are located several inches below the top overhang 130 of the pool. (The distance from the pool top overhang 130 to the top of the skimmer opening 135 is labeled as 140. The distance from the pool top overhang 130 to the top edge 171 of the skimmer weir 170 is labeled as 150). Most, if not all, of the debris typically found in the basins 121 of swimming pool 110 is less dense than water and hence is located in the top layer of the water located in the basin 121 of the swimming pool 110. Thus, for this reason, skimmer manufacturers instruct swimming pool owners to keep the water level in the basin 121 of the pool 110 approximately two-thirds (⅔) of the way up the faceplate 145 (i.e., below the top edge 171 of the skimmer weir 170) so that the skimmer 100 filters the top, debris-containing layer of the pool water. Unfortunately, keeping the water at the manufacturer's recommended level is problematic for several reasons. First, the owner may want to keep the water level in the basin 121 of the pool 110 near the top overhang 130 of the pool 110 for aesthetic effect (i.e., a full pool). Second, if a rainstorm increases the water above the manufacturer's recommended level, the owner must remove some of the water from the pool 110 via a drain so that the water returns to the recommended level. This creates a time burden on the pool owner unless the drainage is automatic and, in any case, is environmentally unfriendly and costly, as pool water and chemicals in the pool water are wasted when the pool is drained.

Some devices in the prior art seek to address some of these water loss issues; however these prior art devices are costly and create hazards in the pool. For example, the Ecoskim™ device (Ecoskim Pty Ltd., Australia), which is disclosed in U.S. Pat. No. 7,993,515 to Davies, is a swimming pool cleaning device that includes an outer body with an outlet to the pool pump line, a hollow mating member, which floats within the outer body so that its top rim is at the surface of the pool and a litter basket which fits within the floating member. The device further includes an inlet that attaches to a hose, which moves about the swimming pool, and a backing plate that fits over the opening of a swimming pool skimmer and prevents water from entering the skimmer opening. The Ecoskim™ device costs approximately $700 U.S. Dollars and relies on the use of a mobile hose, which poses a hazard to children swimming in the swimming pool.

Thus, there is a need for cheap and safe devices that improve the operation of swimming pool skimmers.

BRIEF SUMMARY

The present disclosure provides several systems for increasing the range of a pool skimmer that has a skimmer opening located in a sidewall of a swimming pool.

One such system includes:

a) a swimming pool comprising a basin configured to hold water and a plurality of sidewalls defining a perimeter of the basin;

b) a skimmer comprising a skimmer opening located in one of the sidewalls, the skimmer opening in fluid communication with the basin; and c) a weir assembly located in the basin and adjacent to the skimmer opening, the weir assembly abutting the one sidewall and comprising a plurality of fastener apertures and a weir located in the basin, the weir configured to move in response to changing water levels in the basin, the weir assembly configured to deliver water from the basin to the skimmer opening.

Optionally, the weir is configured to move above the skimmer opening so that water located above the skimmer opening can enter the skimmer. Optionally, the weir assembly further comprises a vacuum release door and a vacuum release opening, the vacuum release door configured to move between a closed position wherein the vacuum release door closes the vacuum release opening and an open position wherein the vacuum release door allows water located in the basin to enter through the vacuum release opening and enter the skimmer opening. Optionally, the vacuum release door is located in the weir. Optionally, the weir assembly further comprises a hinge attaching the vacuum release door to the weir assembly and the vacuum release door is moveable (more particularly pivotable) along the hinge. Optionally, the weir assembly comprises a top half and a bottom half and the vacuum release opening is located in the bottom half of the weir assembly. Optionally, the weir assembly has a height of at least about 4 inches and a width of at least about 4 inches, e.g., a height of from about 4 to about 14 inches and a width of from about 4 inches to about 24 inches.

Optionally, the weir assembly further comprises a plate abutting the pool sidewall, the plate comprising the plurality of fastener apertures, the plate preventing water in the basin from entering the skimmer opening without passing over the weir. Optionally, the plate comprises a flat portion abutting the one sidewall. Optionally, the plate further comprises a plate opening located between the weir and the skimmer opening, the plate opening configured to feed water to the skimmer opening, and further wherein the weir at least partially covers the plate opening. Optionally, the weir further comprises a top, the top comprising an opening configured to feed water from the basin to the plate opening. Optionally, the plate opening has a cross-sectional area from about 4 square inches to about 50 square inches (more preferably from about 16 square inches to about 40 square inches).

Optionally, the system further comprises a plurality of fasteners attaching the weir assembly to the one sidewall. Optionally, the system further comprises a pool pump in fluid communication with the skimmer, the skimmer further comprises a throat and a water exit aperture/drain that feeds water from the skimmer to the pool pump, the throat located between the skimmer opening and the water exit aperture/drain, and the system further comprises an adjustable frame located in the throat, the adjustable frame having an adjustable length and an adjustable height.

Optionally, the system further comprises a plurality of fastener apertures located in the adjustable frame and a plurality of fasteners attaching the adjustable frame to the weir assembly, each of the plurality of fasteners passing through a fastener aperture located in the weir assembly and a fastener aperture located in the adjustable frame. Optionally, the weir assembly further comprises a floor located at a bottom of the weir assembly, the floor abutting the one pool sidewall, the floor configured to inhibit water located in the basin from entering the skimmer opening from below the floor. Optionally, the weir assembly further comprises a motor configured to move the weir in response to changing water levels in the basin. Optionally, the weir assembly further comprises a track configured to allow the weir to move in response to changing water levels in the basin. Optionally, the system further comprises a power source configured to power the motor. Optionally, the weir assembly further comprises a top and the top comprises a solar panel configured to power the motor. Optionally, the system further comprises a water level sensor configured to sense the water level in the basin, and a processor connected to the water level sensor and configured to move the weir in response to data concerning the water level in the basin received from the water level sensor. Optionally, the basin is filled with water, and the weir comprises a top and a float located adjacent to the top, the float configured to allow the top of the weir to float in the water. Optionally, the weir is buoyant in water.

The present invention also provides a method of using a pool skimmer system to increase the range of a pool skimmer, the method comprising:

a) providing the pool skimmer system; and b) flowing water from the basin over the weir (i.e., at least partially over the weir) and into the skimmer opening.

In other embodiments, the present disclosure provides a system that includes at least one track attached to the sidewall and adjacent to the skimmer opening. The track has a track length generally perpendicular to the ground. The first system also includes a weir attached to the track and moveable in a generally vertical position along the track length in response to changing water levels in the pool (more particularly, water levels in the pool basin). The weir preferably is configured to feed water located in the pool (more particularly, in the basin) to the skimmer opening. Preferably, water from the pool flows through a weir recess in the weir and into the skimmer opening. In some embodiments, the weir recess is located in a quarter sphere portion of the weir. Preferably, the system includes two tracks and each track has a track length, a track recess surface extending along the track length, and a sidewall surface configured to face, preferably, abut (and optionally, to attach, directly or indirectly to) the pool sidewall and disposed at about a 90 angle relative to the track recess surface. Optionally, the weir includes a vacuum release opening and a vacuum release door that is configured to move between a closed position in which the door seals the opening and an open position in which the door allows water to enter through the opening. Optionally, the track sidewall surfaces include fastener apertures to attach the track directly or indirectly to the pool sidewall or to the adjustable frame described above. Preferably, the first system includes a weir fastener for immobilizing the skimmer weir (i.e., the weir located inside the skimmer throat). Optionally, the track and weir are comprised of clear plastic.

Another system generally relates to a deflector that faces, preferably abuts (and optionally is attached, directly or indirectly to), the sidewall and that extends outwards into the pool and above the skimmer opening. The deflector further includes an opening. The opening may be centrally located or may be a side opening that is positioned to capture water circulating in a clockwise or counter-clockwise fashion (depending on the circulation pattern of water within the pool, more particularly, within the basin). The opening feeds water to the skimmer opening. As with the prior embodiment, preferably the skimmer weir is immobilized by a weir fastener or removed. Preferably, the deflector does not move within the swimming pool other than to slightly deform in response to pressure applied to the deflector. Preferably, the opening spans substantially the entire height of the deflector and at least above the skimmer opening. Preferably, the deflector includes fastener apertures and fasteners for attaching the deflector directly or indirectly to the sidewall or to the adjustable frame. Preferably, the deflector is attached to a skimmer faceplate that is attached to the pool sidewall. Preferably, the deflector includes a solid, water impermeable floor, which may abut the sidewall, and a top opening so that water flows through only the side or top openings. Preferably, the deflector extends into the pool (more particularly the pool basin) a distance of about 1 inch to about 18 inches so that the deflector does not interfere with swimmers in the pool and the deflector has a height of at least 8 inches (e.g., about 8 inches to about 20 inches).

In another embodiment, the present disclosure provides a system for improving the range of a pool skimmer, the system comprising:

a) a swimming pool comprising a basin configured to hold water and a plurality of sidewalls defining a perimeter of the basin;

b) a pool skimmer, the pool skimmer comprising a skimmer opening located in one of the sidewalls and a skimmer interior; and c) a deflector adjacent to the sidewall comprising the skimmer opening and extending into the basin, the deflector having a rear facing the skimmer opening and comprising a first opening in fluid communication with the skimmer and configured to feed water through the skimmer opening, a front opposite the rear, a left side, a right side, and an interior defined by the front, the rear, and the left and right sides, at least one of the front, the left side and the right side comprising a second opening configured to deliver water from the pool basin to the deflector interior and the first opening, the second opening having a width of at least about 1 inch and a height of at least about 1 inch.

Optionally, the second opening has a height of from about 4 inches to about 12 inches and a width of from about 1 inch about 6 inches. Optionally, the second opening extends above the skimmer opening. The second opening may extend above the skimmer opening at least about 1 inch, preferably about 2 to about 6 inches. Optionally, the rear of the deflector is substantially flat. Optionally, the rear of the deflector is attached to a plate comprising a gasket abutting the pool sidewall. Optionally, the deflector further comprises a weir configured to at least partially cover the second opening, the weir configured to move upwards and downwards in response to changing water levels in the pool basin. Optionally, the weir is configured to move above the skimmer opening. Optionally, the weir is configured to move upwards and downwards in an arc. Optionally, the deflector further comprises at least one track adjacent to the second opening and further wherein the weir is configured to move along the track. Optionally, the deflector is generally circular. Optionally, the weir further comprises at least one wheel and the at least one wheel is configured to move along the track. Optionally, the deflector further comprises two tracks located on opposite sides of the second opening, and further wherein the weir further comprises at least two wheels located on opposite sides of the weir and each wheel is configured to move along a track. Optionally, the tracks are curved and each track forms an arc. Optionally, the second opening is on the left side of the deflector, and the deflector further comprises a third opening on the right side of the deflector, the second and third openings each having a height of from about 4 inches to about 12 inches and a width of from about 1 inch about 6 inches, and the deflector further comprises two tracks adjacent to the second opening and two tracks adjacent to the third opening. Optionally, the weir further comprises at least two wheels located on opposite sides of the weir and each wheel is configured to move along a track adjacent to the second opening, and the deflector further comprises a third weir comprising at least two wheels located on opposite sides of the third weir and each wheel of the third weir is configured to move along a track adjacent to the third opening. Optionally, the weir is buoyant in water. Optionally, the weir comprises a top, a bottom, a tab extending from the top, and a float. Optionally, the float is attached to the tab. Optionally, the float comprises foam. Optionally, the weir comprises a top, a bottom, and a height extending from the top to the bottom, and the weir is curved along its height. Optionally, the weir is configured to move upwards and downwards along an arc in response to changing water levels in the pool basin. Optionally, the deflector further comprises a vacuum release door and a vacuum release opening, the vacuum release door configured to move between a closed position wherein the vacuum release door closes the vacuum release opening and an open position wherein the vacuum release door allows water located in the basin to enter through the vacuum release opening and enter the deflector interior and the first opening. Optionally, the deflector further comprises a hinge attaching the vacuum release door to the deflector and further wherein the vacuum release door is moveable along the hinge. Optionally, the deflector comprises a tab located exterior to the vacuum release door, the tab configured to prevent the vacuum release door from rotating beyond the tab. Optionally, the deflector comprises a top half and a bottom half and the vacuum release opening is located in the bottom half of the deflector. Optionally, the deflector further comprises a magnet to bias the vacuum release door in the closed position. Optionally, the deflector further comprises a bypass opening and a bypass door to removably close the bypass opening, the bypass door configured to move between a closed position wherein the bypass door closes the bypass opening and an open position wherein the bypass door allows water located in the basin to enter through the bypass opening and enter the first opening. Optionally, the bypass door is configured to rotate relative to the bypass opening. Optionally, the bypass door is generally circular in shape and is configured to rotate about a pivot point located in a center of the circle. Optionally, the bypass door is configured to move vertically relative to the bypass opening. Optionally, the system comprises a tube extending from the deflector rear and adjacent to the first opening, the tube having a front end attached to the deflector rear, a rear end, a hollow interior in fluid communication with the first opening, and a wall. Optionally, the tube wall comprises threads. Optionally, the system further comprises a nut comprising threads configured to mate with the tube wall threads. Optionally, the system further comprises a frame located inside the skimmer interior, the frame comprising an aperture receiving the tube, further wherein the nut is attached to the tube, and further wherein the frame is located between the nut and the skimmer opening. Optionally, the deflector further comprises at least one fastener configured to removably attach the deflector to the skimmer interior. Optionally, the fastener is a suction cup. Optionally, except for the first opening, at least 95% of the surface area of the skimmer opening is covered. Optionally, the deflector further comprises a substantially water impermeable floor. Optionally, the deflector further comprises a top, the top comprising a top aperture. Optionally, the pool skimmer further comprises a skimmer weir located inside the pool skimmer interior and the skimmer weir is immobilized. Optionally, the pool skimmer does not have a skimmer weir in the skimmer interior.

In some embodiments, the present disclosure provides a method of using a system to increase the range of a pool skimmer that includes a) providing the system; and b) flowing water from the basin, through the second opening, through the deflector interior, through the first opening, through the skimmer opening, and into the skimmer interior.

In some embodiments, the present disclosure provides a pool skimmer system comprising:

a) a swimming pool comprising a basin configured to hold water and a plurality of sidewalls defining a perimeter of the basin;

b) a pool skimmer, the pool skimmer comprising a skimmer opening located in a sidewall and a skimmer interior;
c) two tracks located in the pool basin; and
d) a weir located in the pool basin, the weir configured to move upwards and downwards and regulate water entering the skimmer opening, the weir having opposite sides, each of the opposite sides having at least one wheel attached thereto, each of the wheels received in a track.

Optionally, the tracks are curved and the weir is configured to move in an arc upwards and downwards. Optionally, the skimmer interior further comprises a skimmer basket. Optionally, the system further comprises a pump in fluid communication with the basin and the skimmer interior.

In some embodiments, the present disclosure provides a pool skimmer comprising:
a) a skimmer interior;
b) a front end comprising a top, a bottom, and a skimmer opening leading to the skimmer interior and comprising a top, a bottom, a left side, a right side, a width extending from the skimmer opening left side to the skimmer opening right side of at least about 2 inches and a height extending from the skimmer opening top to the skimmer opening bottom of from about 2 inches to about 16 inches (preferably about 5 inches to about 16 inches);
c) a rear end comprising a top comprising a top opening, a lid configured to removably close the top opening, a bottom comprising a bottom opening in fluid communication with the skimmer opening, a well located directly below the top opening, the bottom opening extending into the well, a skimmer basket located in the well and comprising a floor, a sidewall extending from the floor, at least one of the floor and the sidewall comprising a plurality of apertures; and
d) a middle portion located between the front end and the rear end and comprising a top, a bottom, and a throat in fluid communication with the skimmer opening and the rear end, wherein the top of the front end, the top of the rear end, and the top of the middle portion are within about 1 inch of each other when the top of the front end, the top of the rear end, and the top of the middle portion are positioned parallel to the ground.

Optionally, the top of the front end, the top of the rear end, and the top of the middle portion are within about 0.5 inches of each other when the top of the front end, the top of the rear end, and the top of the middle portion are positioned parallel to the ground.

Optionally, the height of the skimmer opening is from about 8 inches to about 14 inches. Optionally, the width of the skimmer opening is between about 3 and about 6 inches. Optionally, the pool skimmer further includes a weir configured to move upwards and downwards. Optionally, the weir is located adjacent to the skimmer opening (e.g., about 0 to about 6 inches from the skimmer opening). Optionally, the skimmer comprises a left track and a right track and the weir is configured is configured to move along the left and right tracks. Optionally, the weir further comprises at least one left wheel located in the left track and at least one right wheel located in the right track. Optionally, the weir further comprises a float. Optionally, the float comprises foam. Optionally, the weir is hingedly attached to the skimmer and is configured to pivot between a horizontal position in which the weir is parallel to the lid and a vertical position in which the weir is perpendicular to the lid. Optionally, the weir further comprises a vacuum release door and a vacuum release opening, the vacuum release door configured to move between a closed position wherein the vacuum release door closes the vacuum release opening and an open position wherein the vacuum release door allows water to enter through the vacuum release opening. Optionally the weir further comprises a hinge attaching the vacuum release door to the weir and further wherein the vacuum release door is moveable along the hinge. Optionally, the weir comprises a tab located exterior to the vacuum release door, the tab configured to prevent the vacuum release door from rotating beyond the tab. Optionally, the weir comprises a top half and a bottom half and the vacuum release opening is located in the bottom half of the weir. Optionally, the throat has a length of from about 3 inches to about 12 inches. Optionally, the throat is generally rectangular in shape.

Without being bound to any particular theory, it is believed that the apparatuses are relatively cheap to manufacture, safe, conserve water and chemical use, and allow for an aesthetically pleasing full pool.

BRIEF DESCRIPTION OF THE DRAWINGS

FIG. 18 shows that the deflector is attached to an adjustable frame located inside the skimmer.

in FIG. 21, the weir assembly includes a central plate and two side plates that cover a skimmer with a large opening.

DETAILED DESCRIPTION

Figure 17:
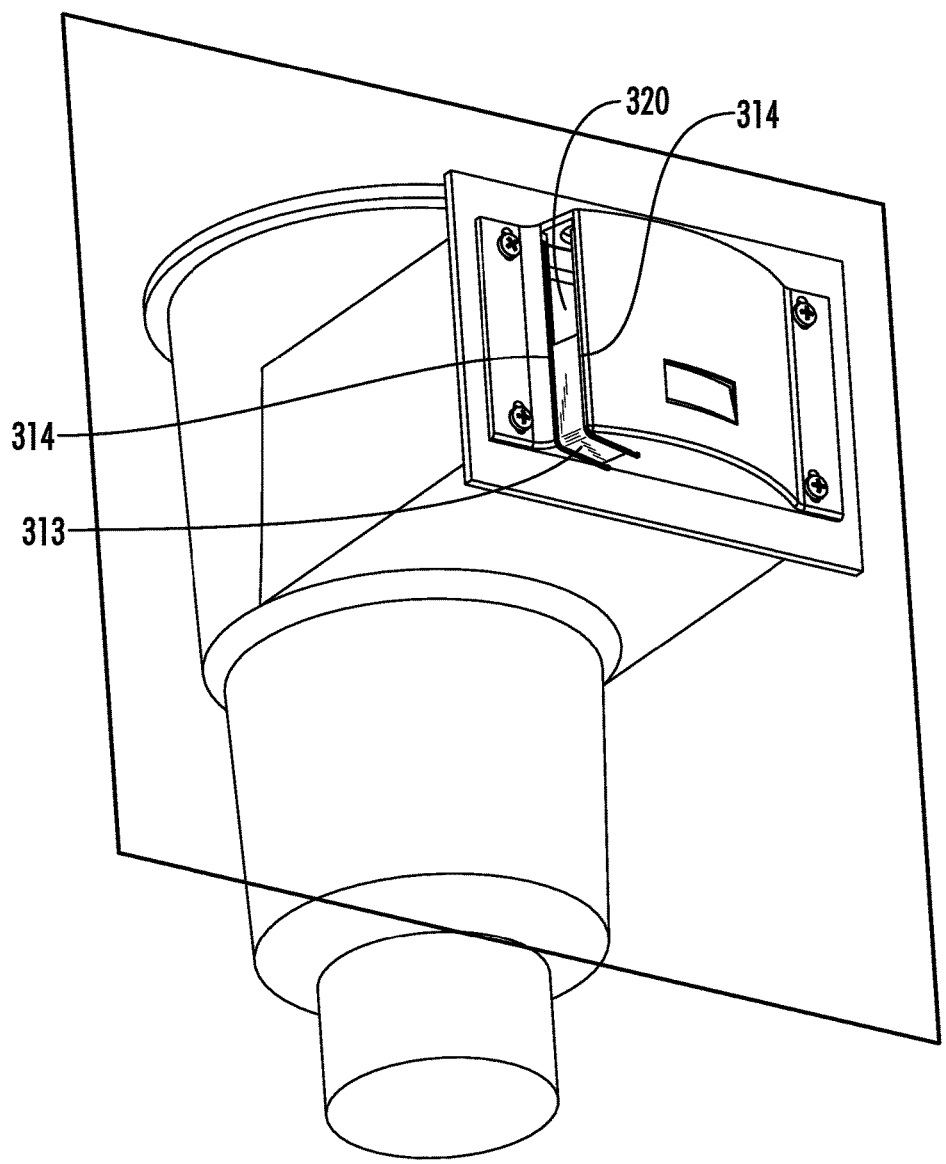
FIG. 17 illustrates another front, perspective view of the deflector of FIG. 16.
Figure 18:
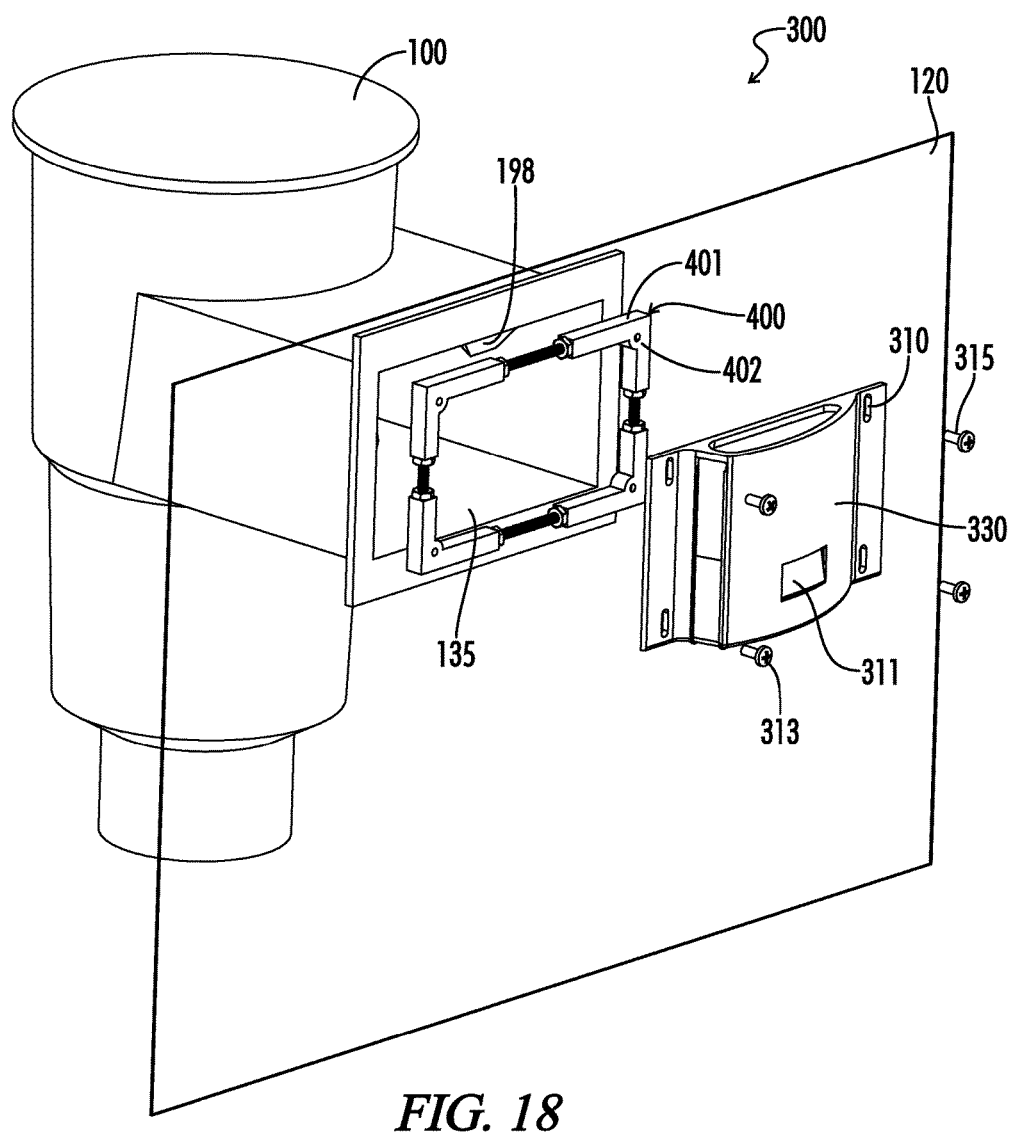
FIG. 18 illustrates a front, exploded, perspective view of the deflector of FIG. 16.
Figure 19A:
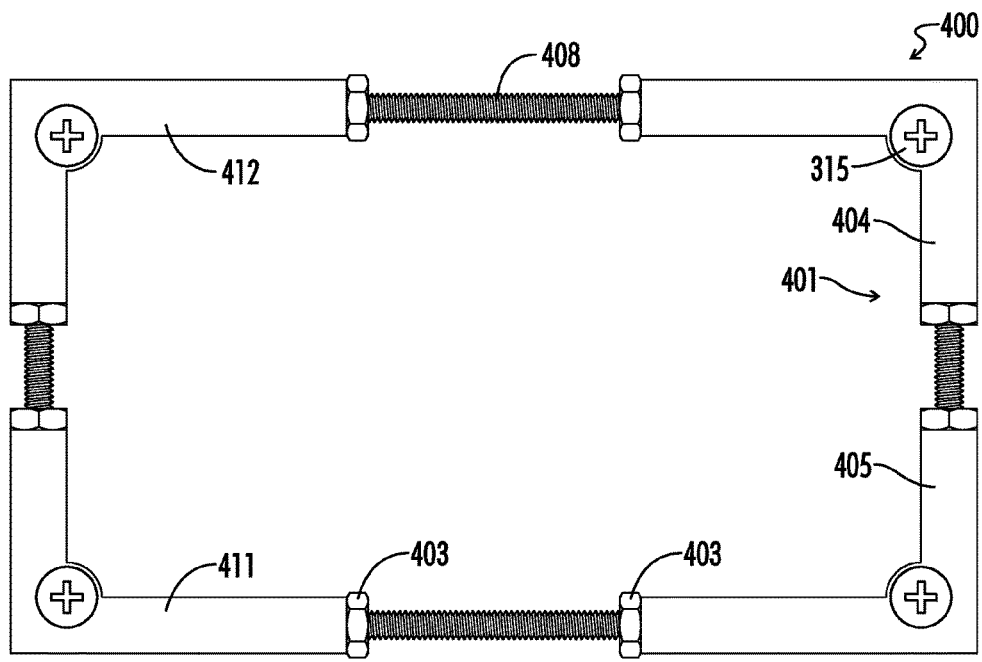
FIG. 19A is a front, elevation view of the adjustable frame of FIG. 18.
Figure 19B:
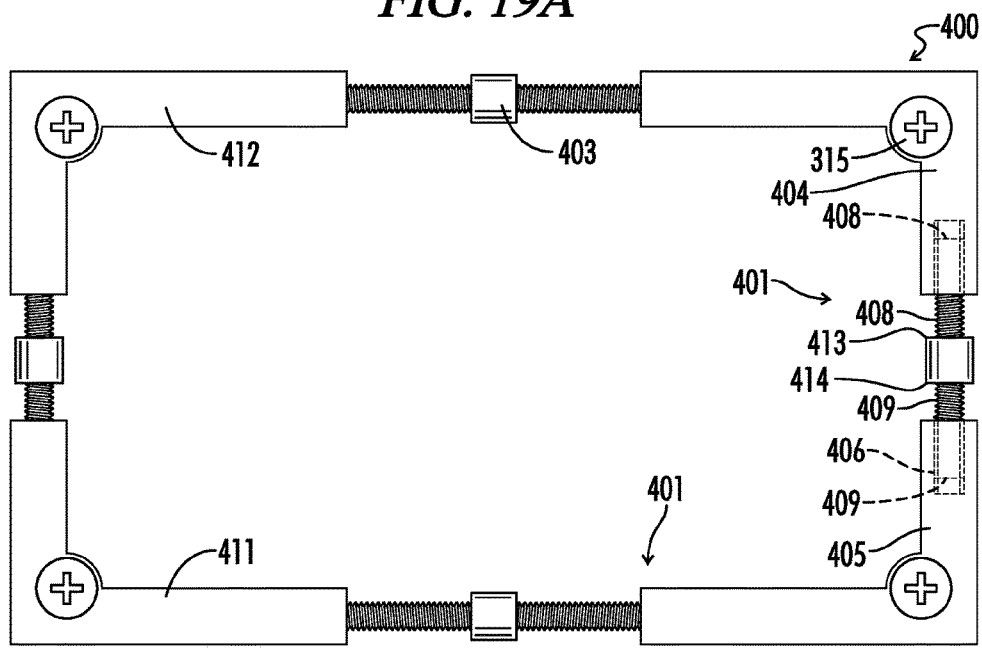
FIG. 19B is a front, elevation view of another embodiment of an adjustable frame.
Figure 20:
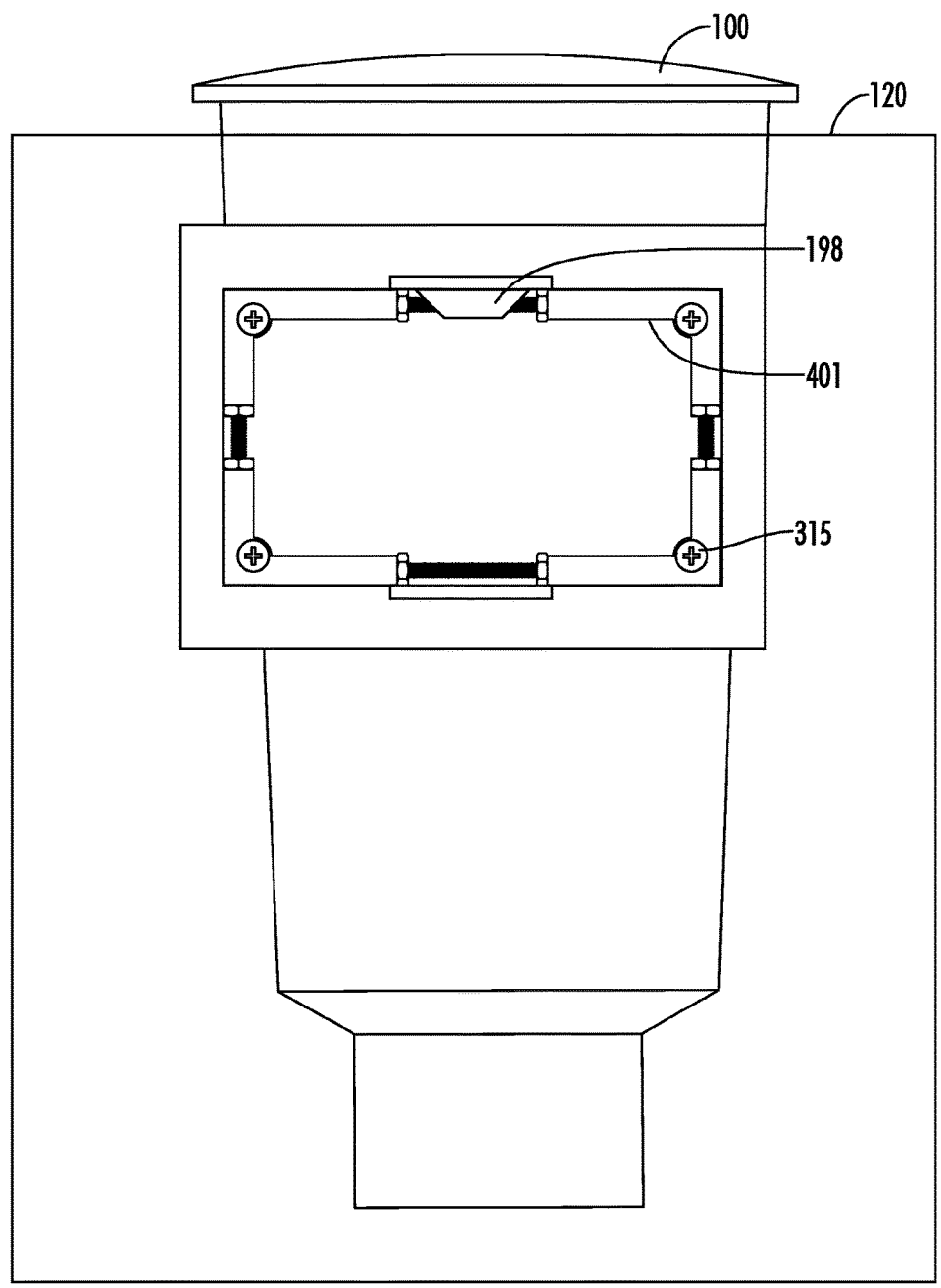
FIG. 20 is a front elevation view of the adjustable frame of FIG. 18 inside a skimmer, the deflector is not shown in FIG. 20 so that the frame is visible.
Figure 32:
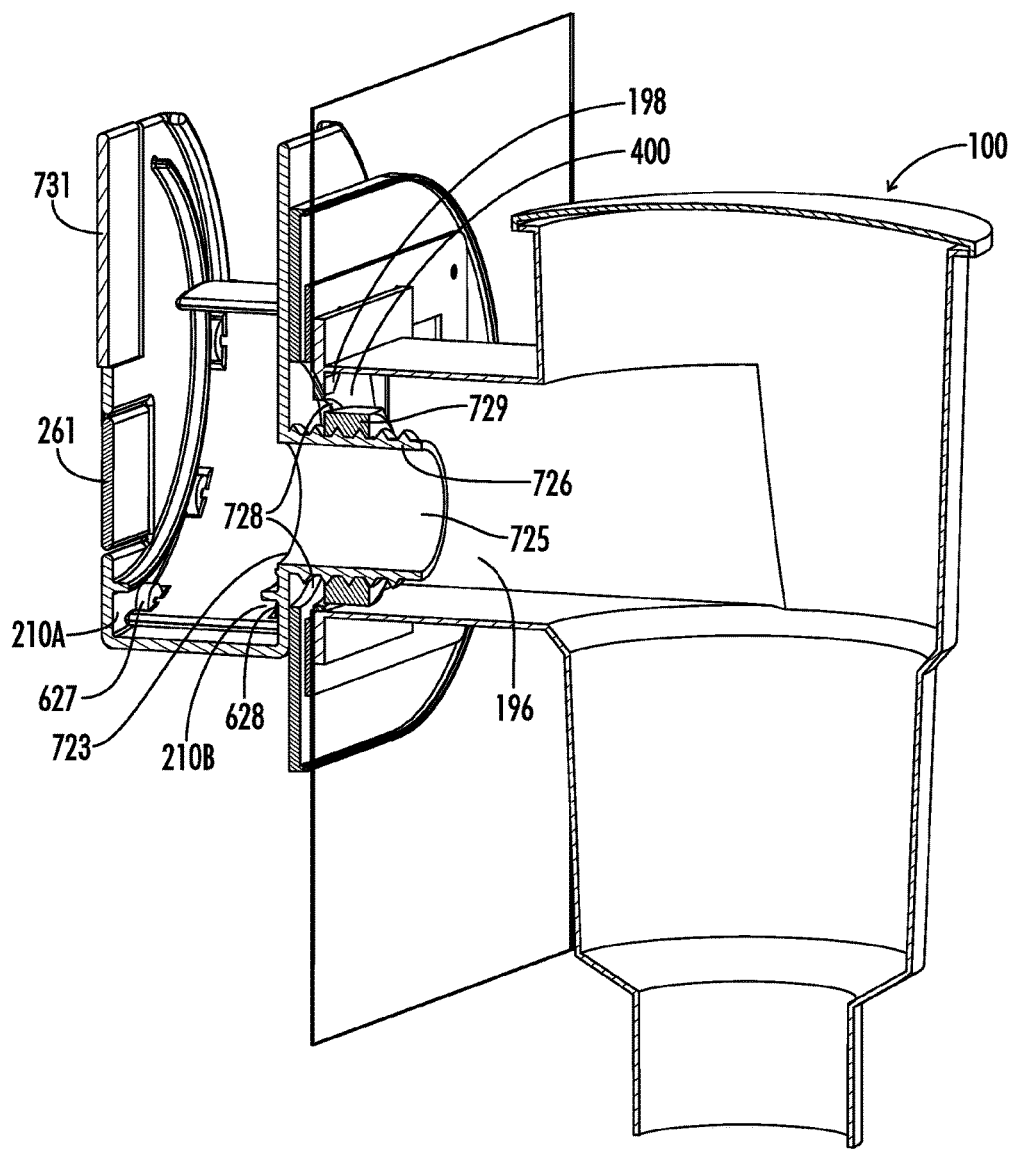
FIG. 32 is a right side, cross-sectional view of the system of FIG. 31, taken along the line 32-32 of FIG. 31.
Figure 33:
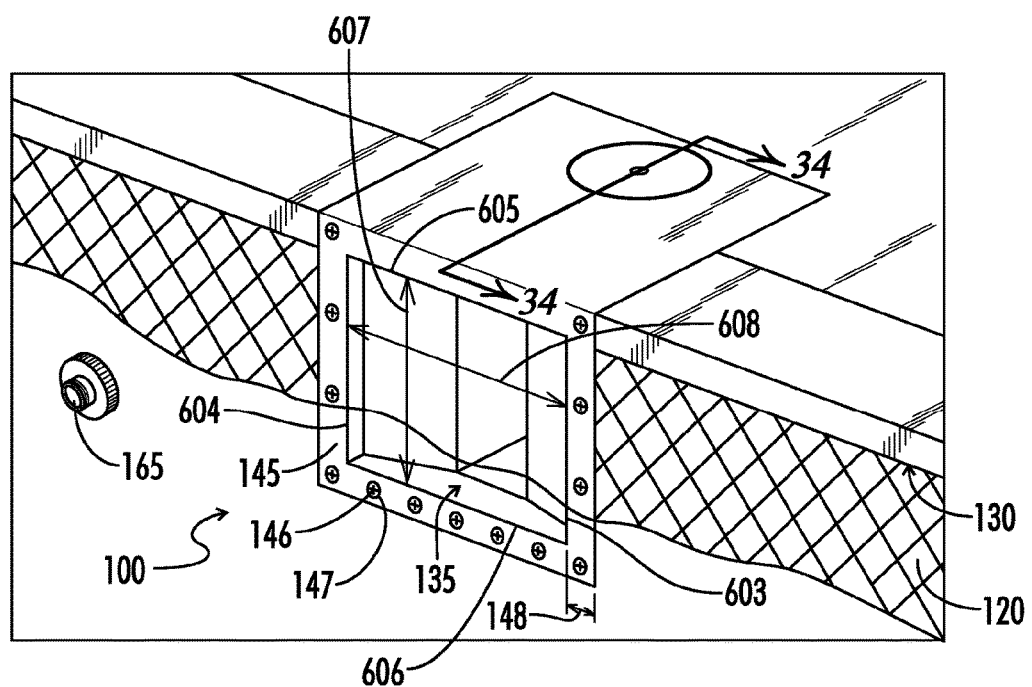
FIG. 33 illustrates a front, perspective view of a skimmer of one embodiment of the present invention and a pool sidewall.
Figure 34:
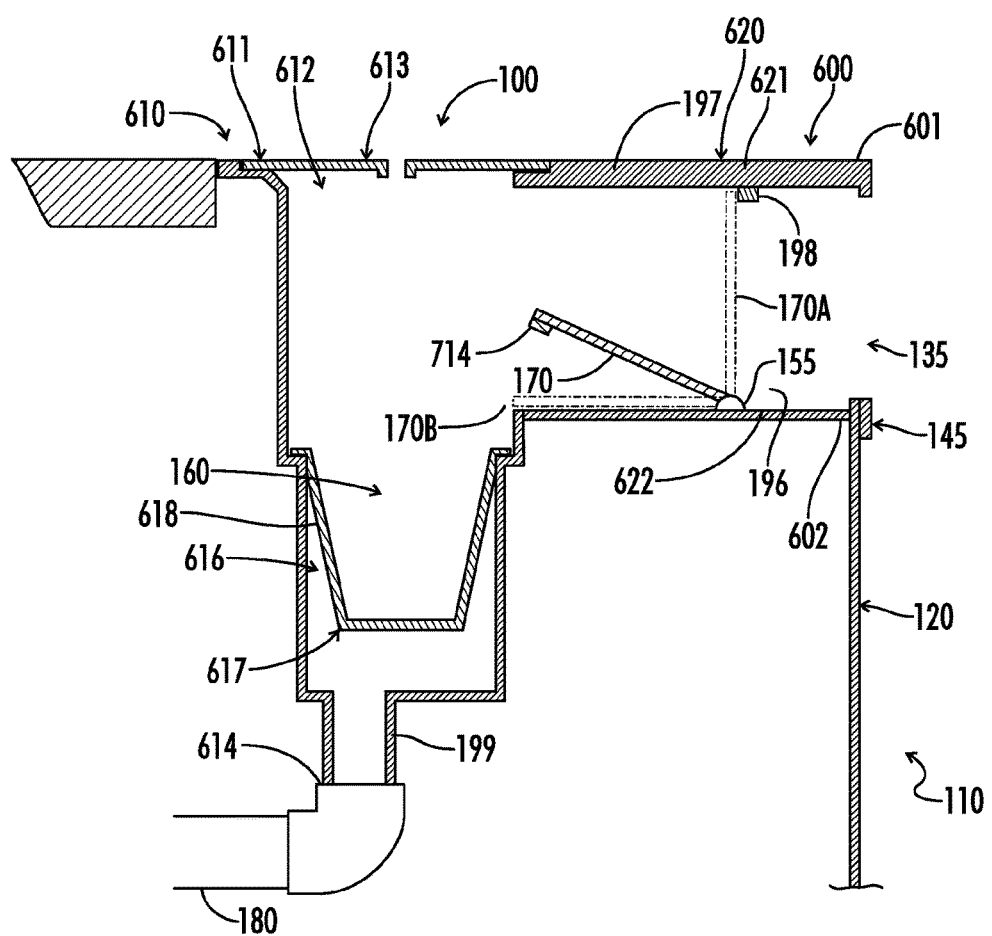
FIG. 34 illustrates a cross-sectional view of the skimmer of FIG. 33, taken along line 34-34 of FIG. 33.
Figure 35:
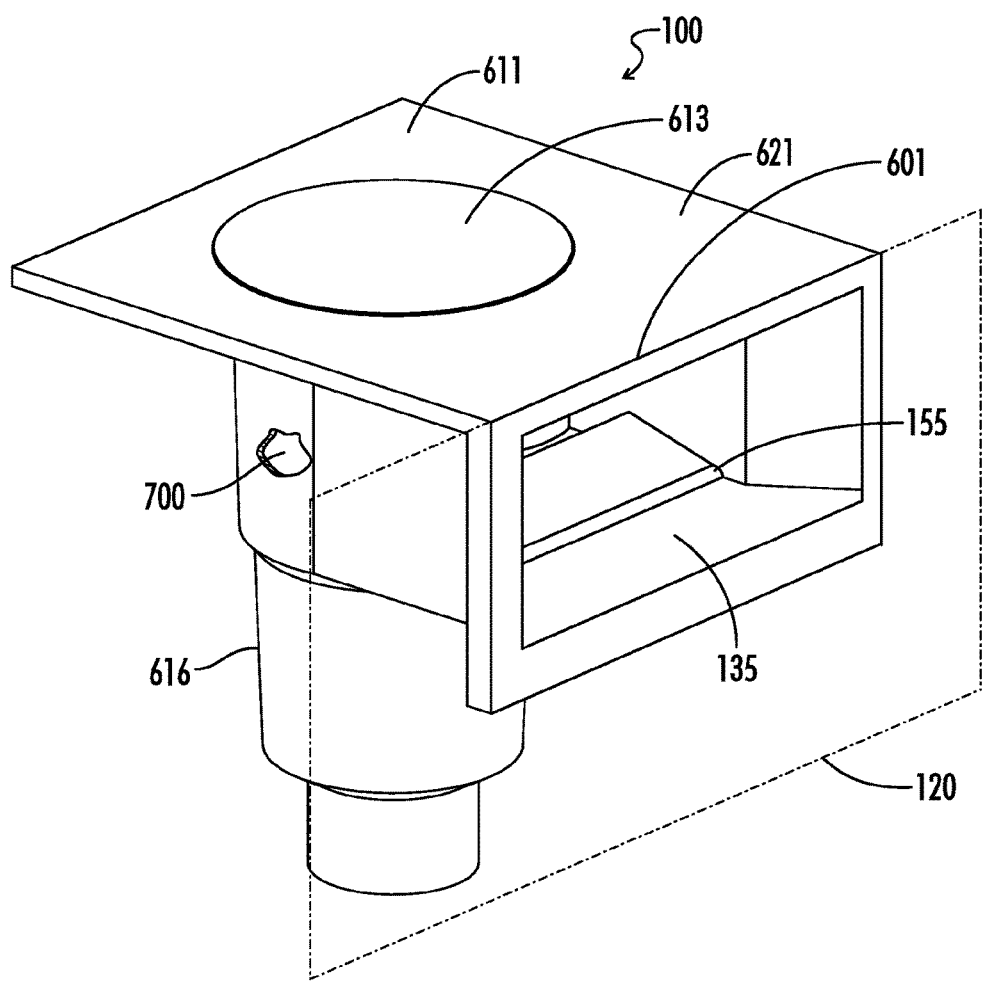
FIG. 35 illustrates a front, perspective view of the skimmer of FIG. 33.

The present disclosure provides several systems for increasing the range of a pool skimmer 100. The first system is designated by the numeral 200, is illustrated in FIGS. 4-10, and generally relates to a weir 230 that moves along one or more tracks 210. The second system is designated by the numeral 300, is illustrated in FIGS. 11-18 and generally relates to a deflector 330. A third system is designated by the numeral 500, is illustrated in FIGS. 21-24 and also generally relates to a weir 530 that moves along one or more tracks 510. A fourth system, related to the above systems, is shown in FIGS. 25-32 and also generally relates to a deflector 330 and optionally includes a weir 230. FIGS. 19-20 generally relate to attachment mechanisms for the above systems. A fifth system is shown in FIGS. 33-35 and generally relates to a new design for a skimmer 100. In the drawings, not all reference numbers are included in each drawing for the sake of clarity. The systems illustrated in FIGS. 4-32 may be used in conjunction with any suitable pool skimmer, and are preferably used with immobile skimmers that are located in swimming pool, pond, fountain, or spa sidewalls, such as the skimmer 100 illustrated in FIGS. 1-3. As used herein, the term "pool" means a swimming pool, pond, fountain or spa. Typically, the pool 100 includes a basin (or swimming area) 121, the perimeter of which is defined by a plurality of sidewalls 120 and the bottom of which is defined by a floor 122. The floor 122 usually includes a bottom drain 101, as described above. While the systems illustrated in FIGS. 4-35 may be used in spas, it will be appreciated that the systems are preferably used in swimming pools, given that spas generally have a small surface area and are typically covered during rainstorms. While one pool 110 may use two or more different systems, generally, only one type of system will be used with any one skimmer 100. In other words, a given skimmer 100 will typically be outfitted with only one of the systems. It will be appreciated that the systems may each comprise several embodiments as described herein.

Figure 8:
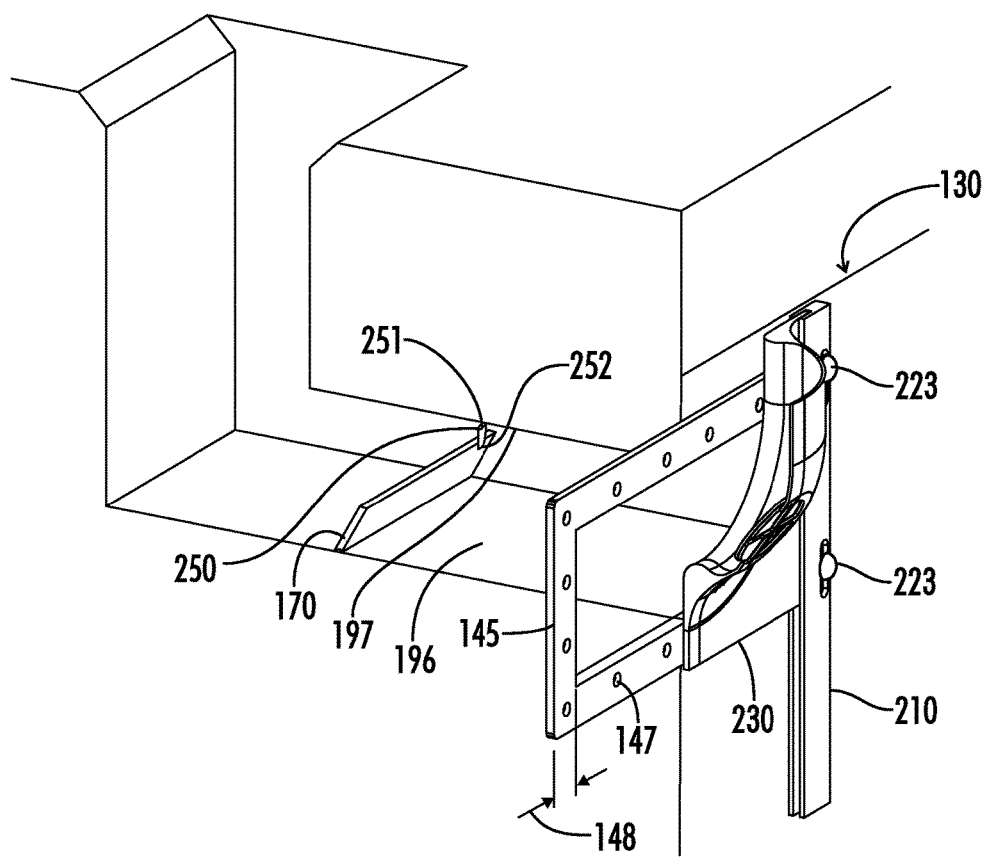
FIG. 8 illustrates a front, cut-away view of the system of FIG. 4 attached to the faceplate of a pool skimmer.
Figure 9:
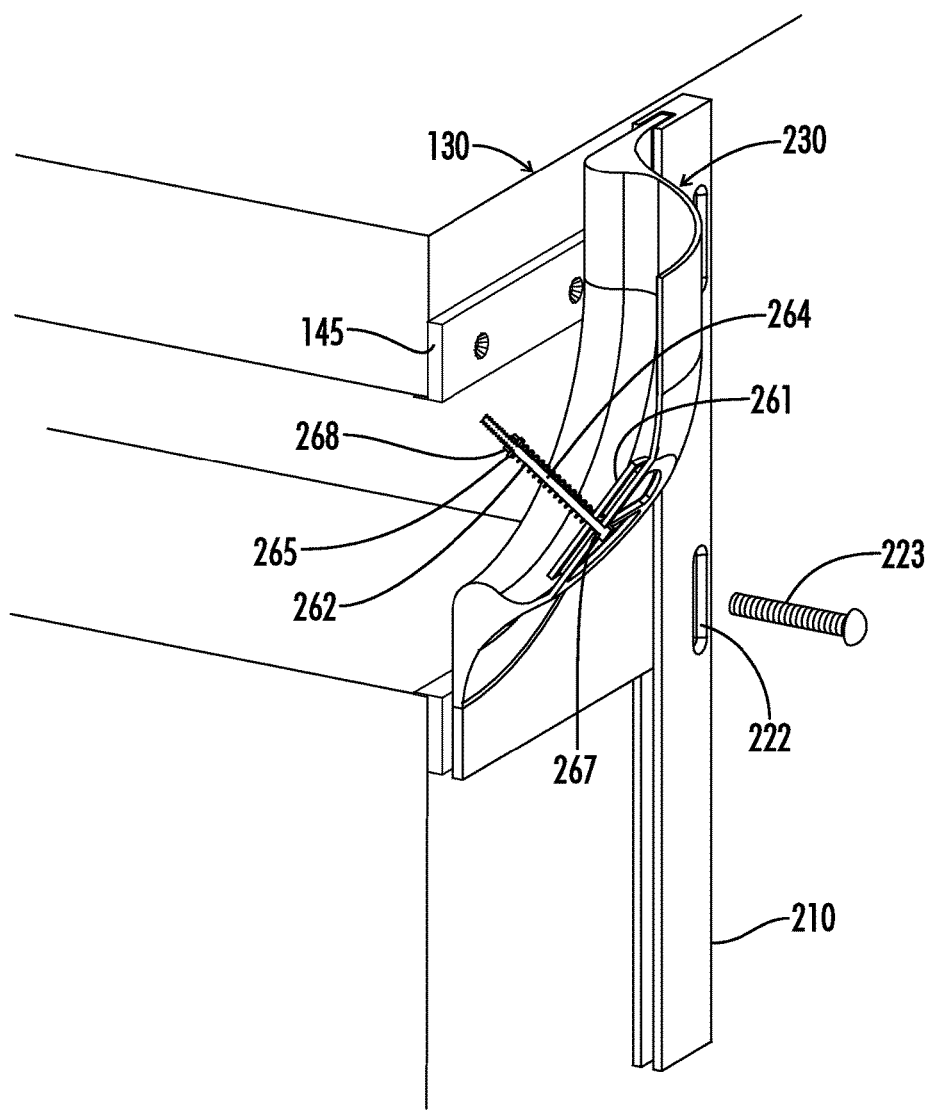
FIG. 9 illustrates a close-up, front, cut-away view of the system of FIG. 4 attached to the faceplate of a pool skimmer.
Figure 10:
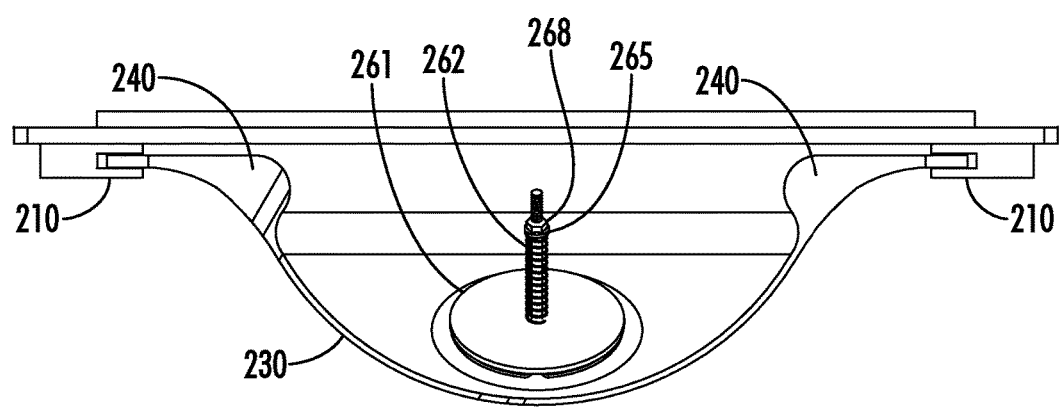
FIG. 10 illustrates a top view of the system of FIG. 4.
Figure 11:
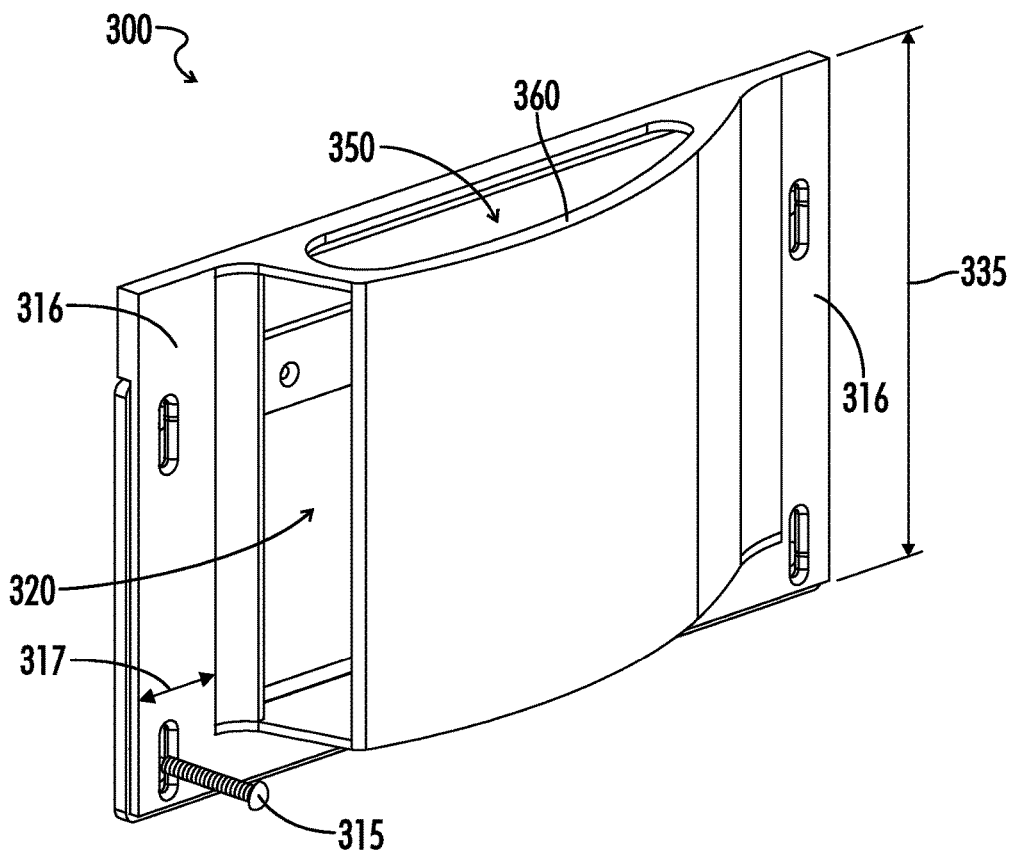
FIG. 11 illustrates a front, perspective view of one embodiment of a deflector of the present invention.
Figure 12:
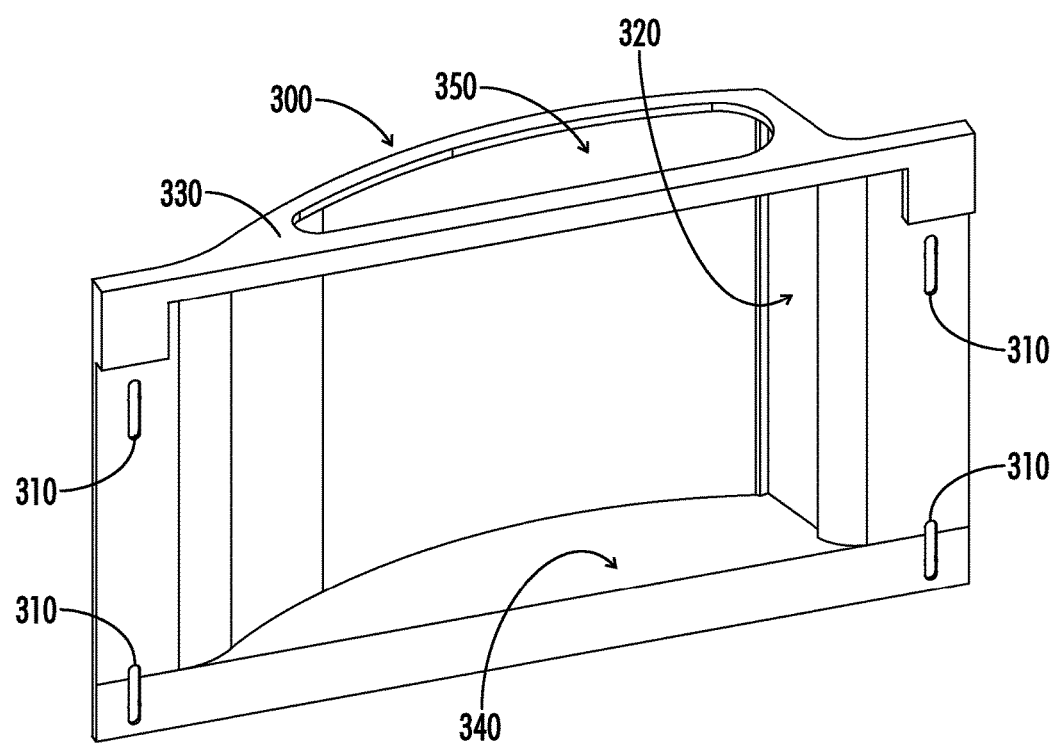
FIG. 12 illustrates a rear, perspective view of the deflector of FIG. 11.
Figure 13:
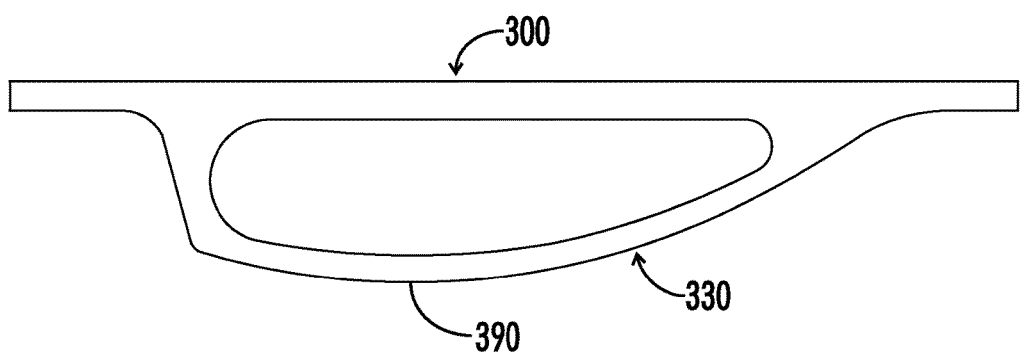
FIG. 13 illustrates a top, plan view of the deflector of FIG. 11.
Figure 14:
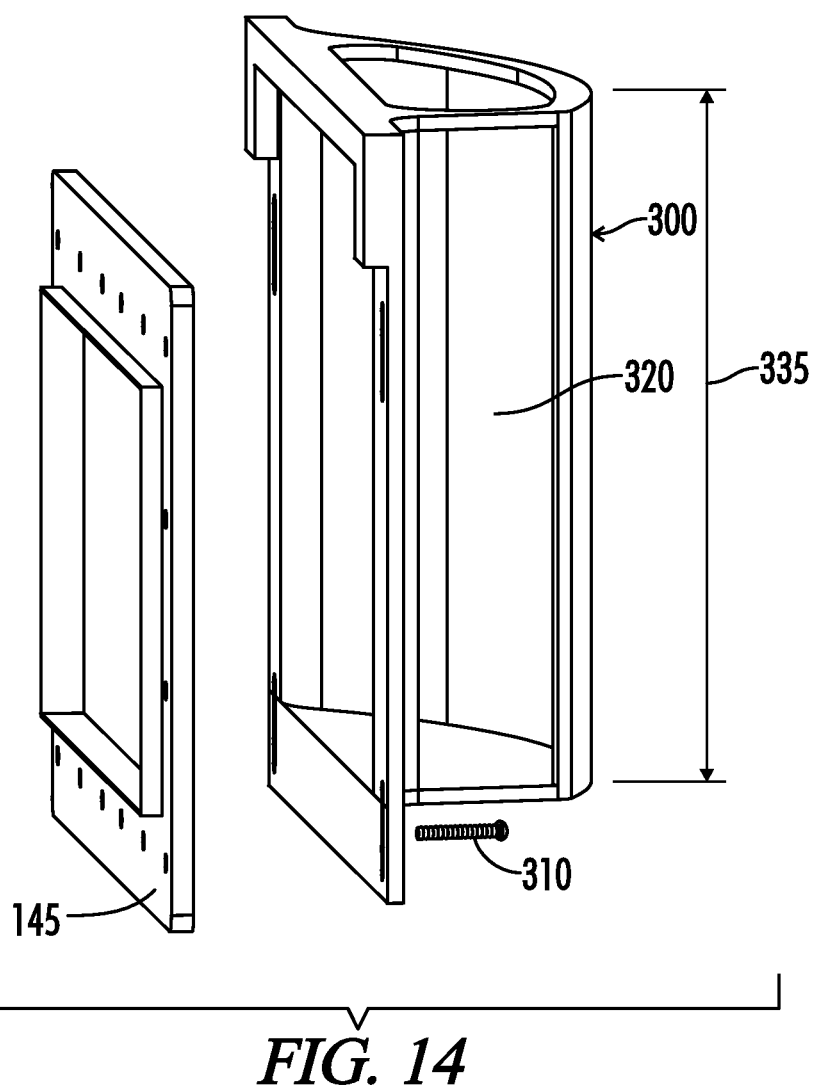
FIG. 14 illustrates a side, elevational view of the deflector of FIG. 11 and a faceplate of a pool skimmer.

Referring further to the first system 200, as shown in FIGS. 4-10, the system 200 generally includes one or more tracks 210, typically two parallel tracks 210. The track 210 includes a track length 215 and a track recess surface 220. Preferably, the track 210 has a length 215 of at least about 6 inches (e.g., about 6-24 inches) and a thickness 216 that is substantially equal to the thickness 148 of the faceplate 145 (e.g., about 1-3 inches). The track recess surface 220 includes a track recess 225 extending along the track length 215. When it is mentioned that the track recess 225 extends along the track length 215, it is meant that the track recess 225 extends at least partially along the track length 215. In a preferred embodiment, the track recess 225 extends substantially the entire track length 215. More preferably, the track recess 225 extends the entire track length 215 so that the weir 230 can be installed from either the top or the bottom of the track 210 and so that the weir 230 can slide out of the bottom of the track 210 if struck in a downward motion as a safety feature. The track 210 further includes a sidewall surface 221 configured to face, preferably abut (and optionally attach (i.e., directly or indirectly to)) the pool sidewall 120. In a particularly preferred embodiment, the sidewall surface 221 is configured to attach to the sidewall 120 by attaching to a skimmer faceplate 145 that is attached to the sidewall 120. Preferably, the sidewall surface 221 is disposed at an angle of approximately 90 degrees relative to the track recess surface 220. Preferably, the sidewall surface 221 includes one or more fastener apertures 222 for attaching the track 210 directly or indirectly to the pool sidewall 120. Preferably, the fastener apertures 222 are configured to receive a fastener 223 (e.g., bolt, screw, etc.) so that the fastener 223 may attach the track 210 to the skimmer faceplate 145. In a particular embodiment, the fasteners 223 are a plurality (e.g., four) of pan-head screws that are used to attach two tracks 210 to the skimmer faceplate 145 and the fastener apertures 222 are longer than the diameter of the pan-head screw 223, as best seen in FIG. 8, and counter-sunk for the seats of the pan-head screw 223, which allows for the proper seating of the screws 223 and gives the flexibility of height adjustment of the track 210. In some embodiments, the systems described herein include fastener aperture covers (not shown) that fit inside unused fastener apertures so that water and debris does not enter unused fastener apertures. In some embodiments, some or all of the fastener apertures described herein are threaded (e.g., nuts) and configured to receive a threaded rod.

Figure 1:
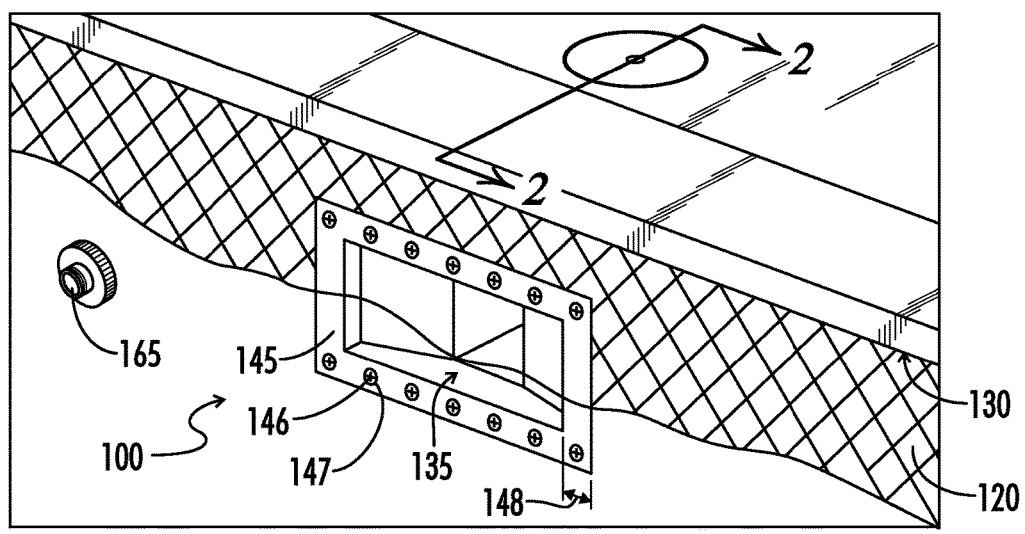
FIG. 1 illustrates a front, perspective view of a prior art skimmer and pool sidewall.
Figure 2:
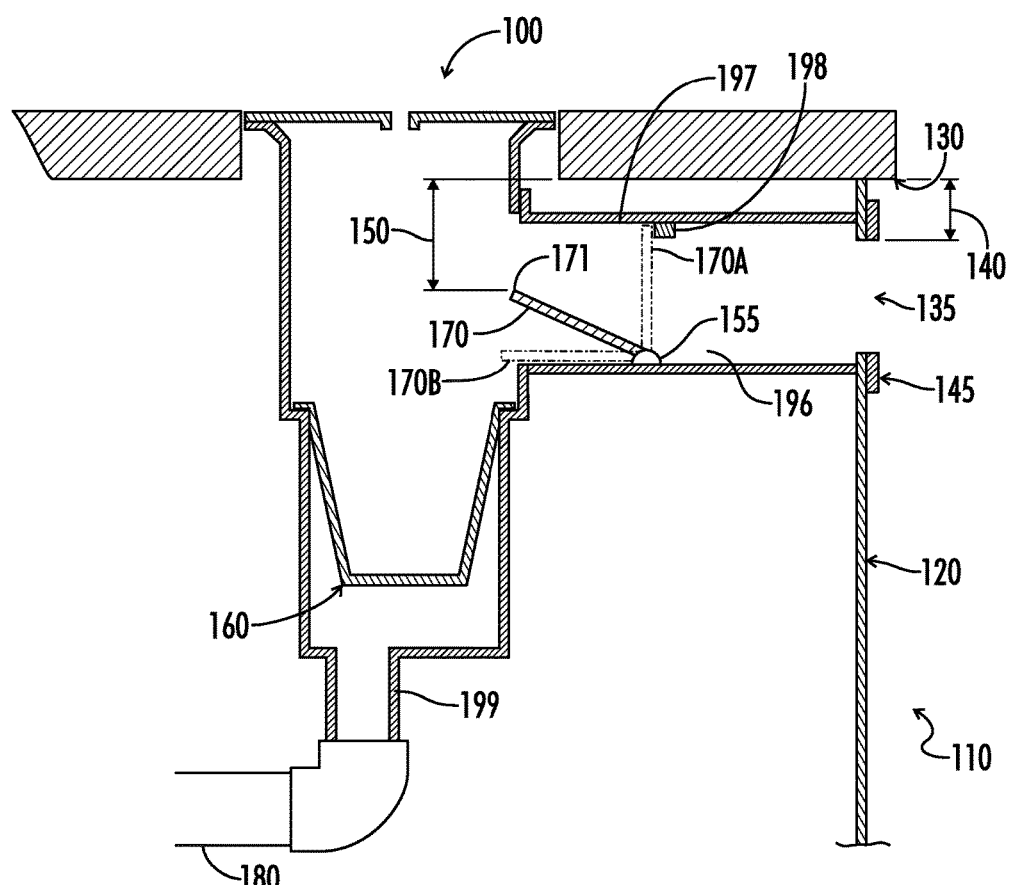
FIG. 2 illustrates a cross-sectional view of the prior art skimmer of FIG. 1, taken along line 2-2 of FIG. 1.
Figure 3:
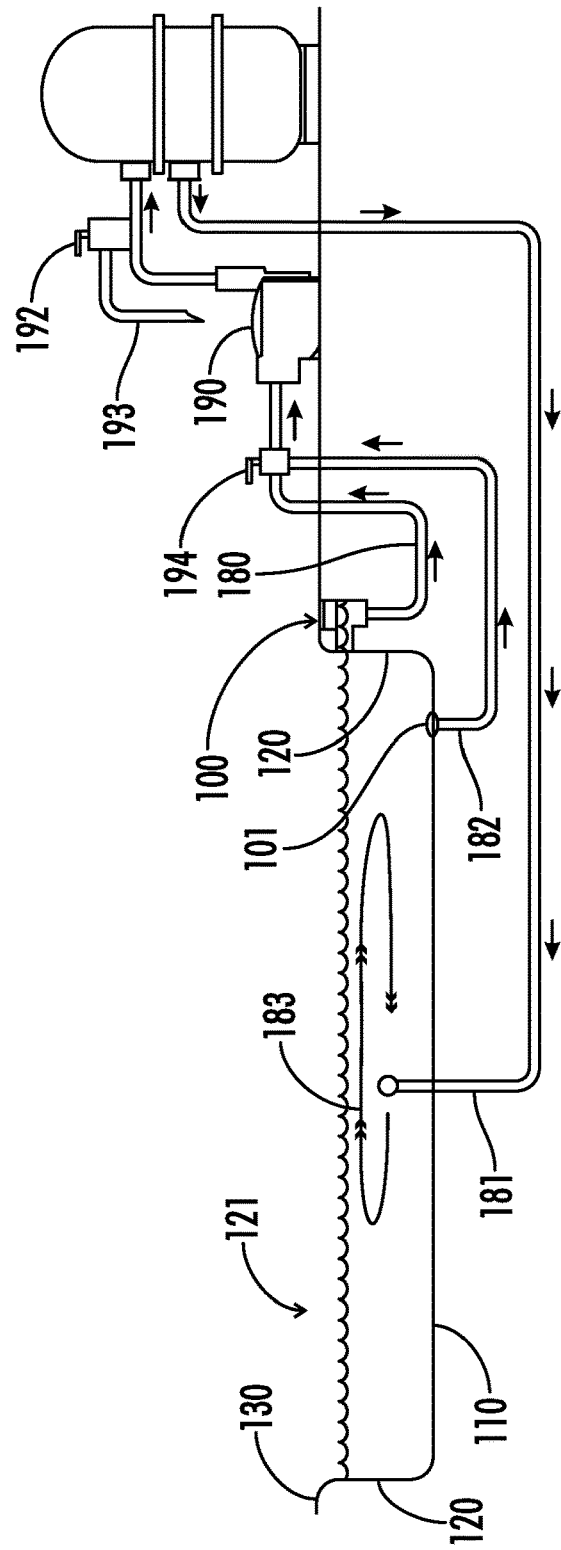
FIG. 3 illustrates a schematic view of water circulating in a clockwise fashion in a swimming pool with a prior art skimmer.
Figure 4:
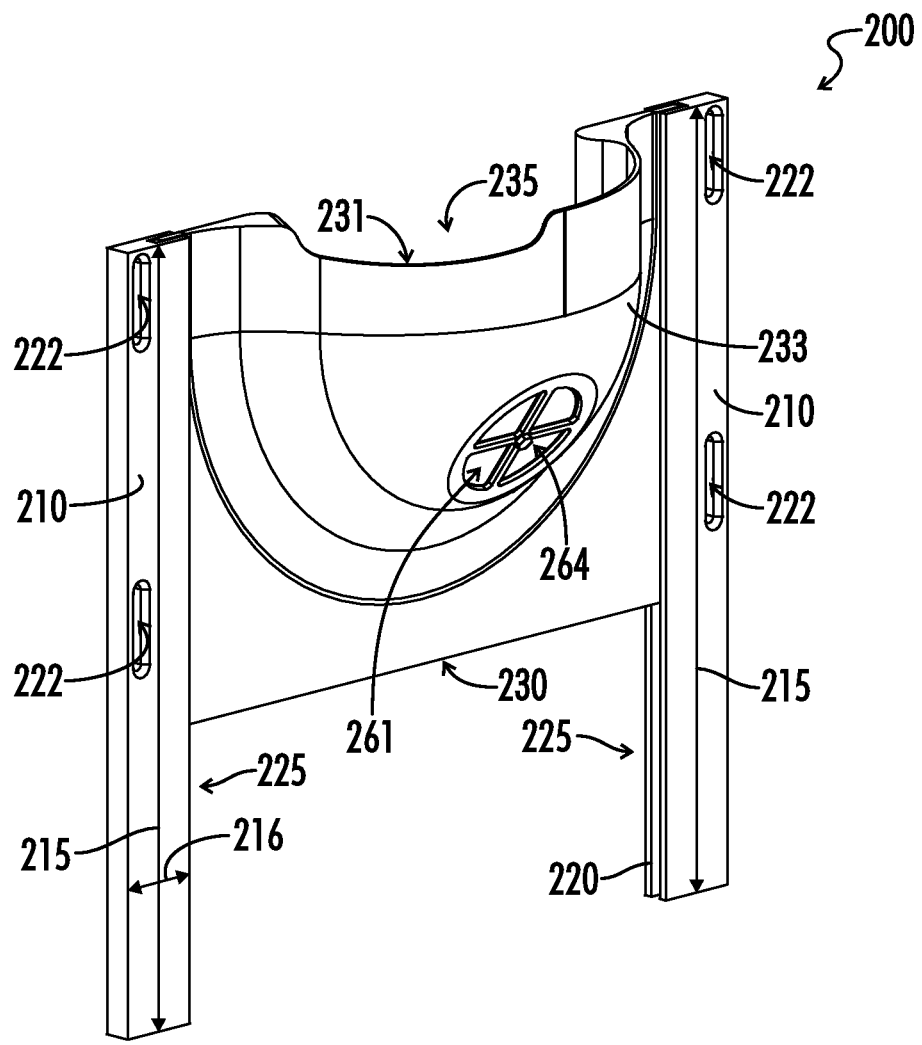
FIG. 4 illustrates a front, perspective view of a system of one embodiment of the present invention for increasing the range of a pool skimmer.
Figure 5:
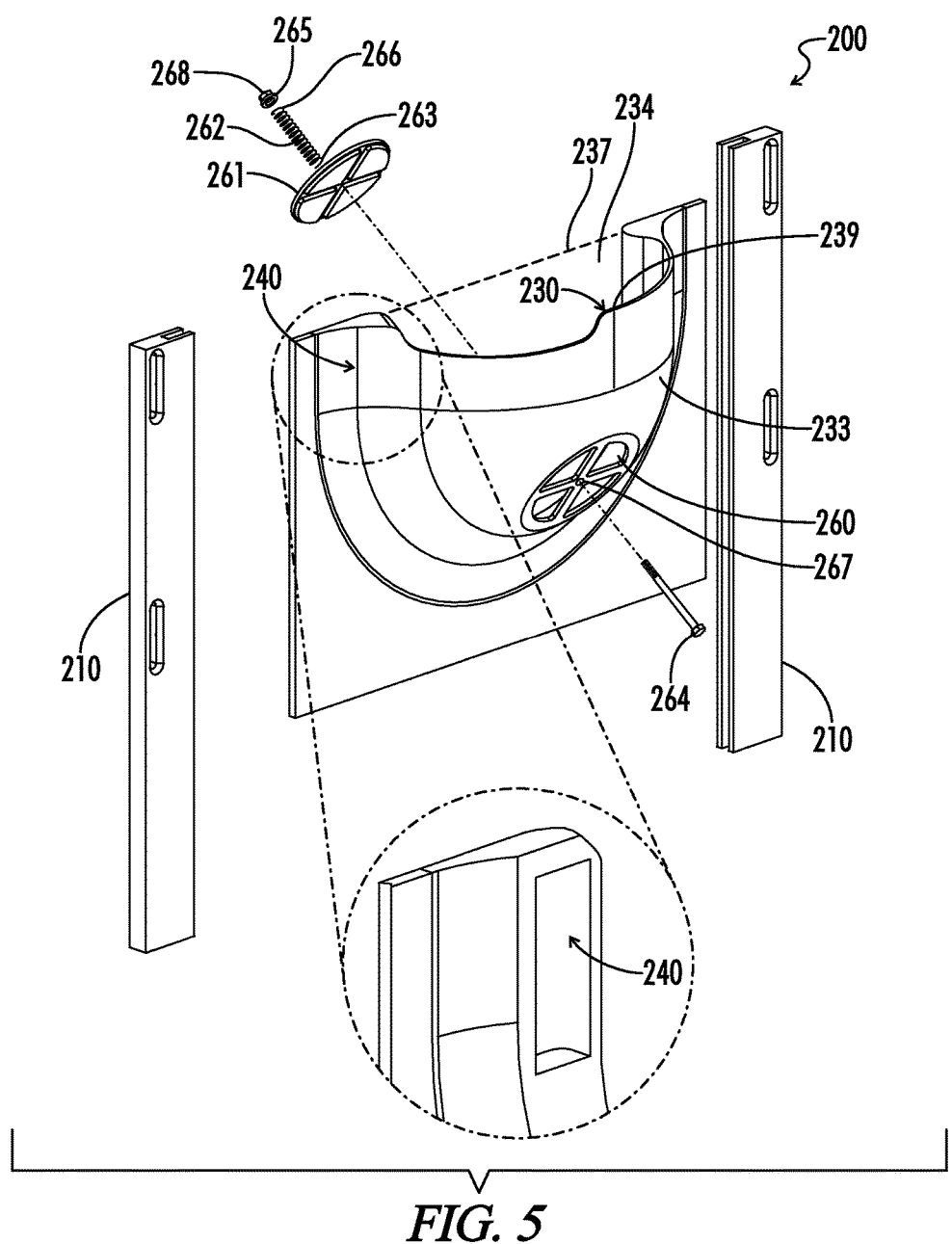
FIG. 5 illustrates a front, exploded view of the system of FIG. 4.
Figure 6:
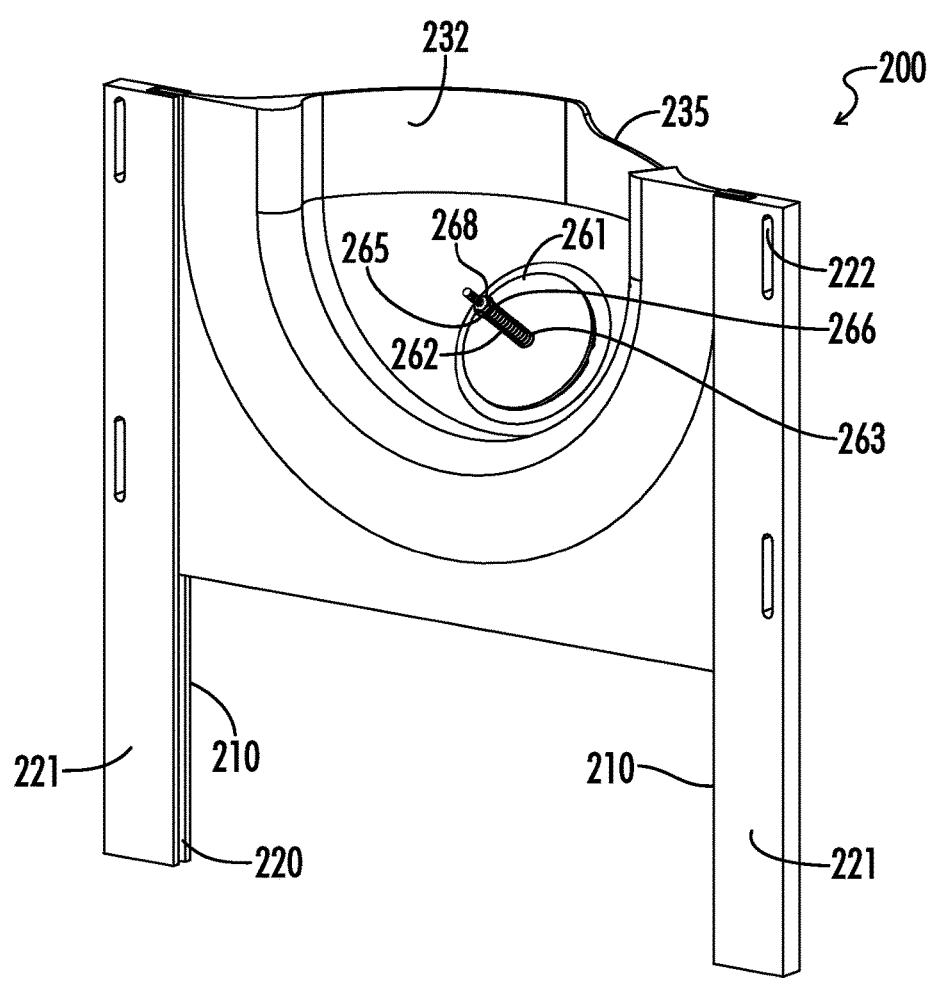
FIG. 6 illustrates a rear, perspective view of the system of FIG. 4.
Figure 7:
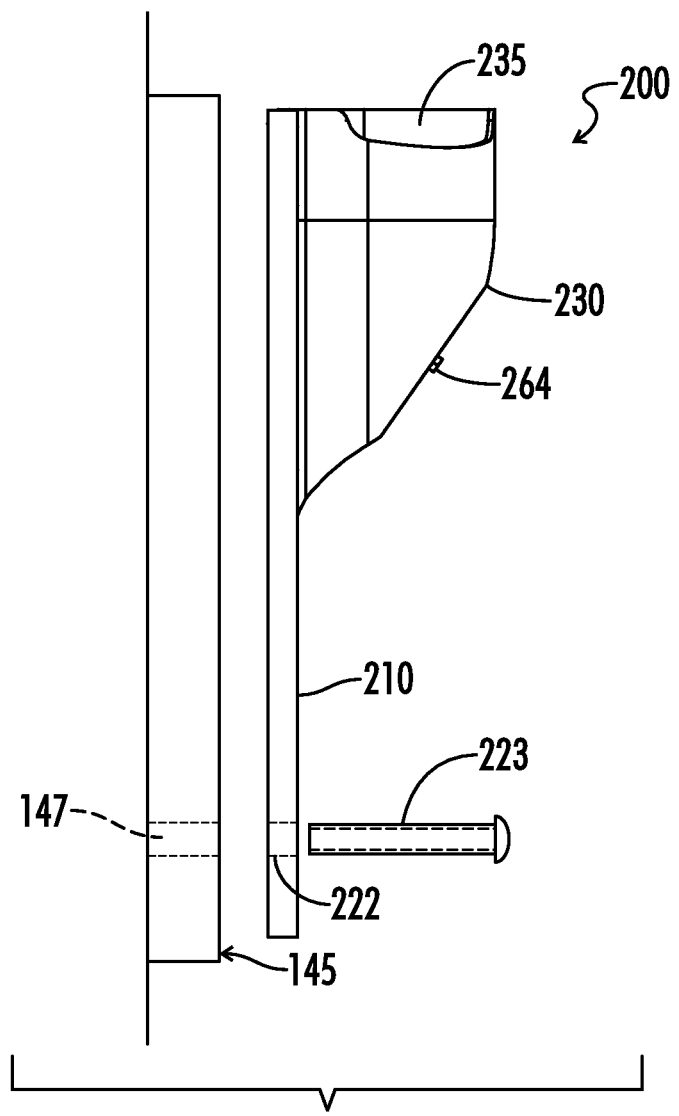
FIG. 7 illustrates a side, elevational view of the system of FIG. 4.

The first system 200, as previously noted, is particularly useful in conjunction with the typical skimmer 100 illustrated in FIGS. 1-3. As previously noted, such skimmers 100 typically include a skimmer opening 135 and a skimmer weir 170 located inside the skimmer 100 (more particularly inside throat 196), which pivots between a vertical position (shown in phantom line 170A in FIG. 2) in which the skimmer weir 170 is generally parallel to the sidewall 120 (and perpendicular to the ground) and prevents large debris from flowing through the skimmer 110 (more precisely, beyond the skimmer weir 170) and a horizontal position (shown in phantom line 170B in FIG. 2) in which the skimmer weir 170 is generally perpendicular to the sidewall 120 (and parallel to the ground) and allows debris to flow through the skimmer 100 until the debris reaches a filter or debris basket 160. For ease of reference, the skimmer weir 170 of a conventional skimmer 100, located in the throat 196, is referred to herein as the "skimmer weir" and the additional weir 230, 313 and 530, located exterior to the skimmer 100 in basin 121 and provided by the systems of FIGS. 4-32, is referred to herein as the "additional weir." However, it will be understood that systems of FIGS. 4-32 may include only the additional weir, given that skimmer weir 170 may be removed as described below.

In addition to the optional skimmer weir 170, the first system 200 further includes an additional weir 230. The additional weir 230 is configured to be received in the track recess 225 when the track 210 faces, preferably abuts, and (optionally is attached to) the sidewall 120 so that the additional weir 230 may move in a generally vertical direction (relative to the ground) along the track length 215 in response to changing water levels in the pool 110 (more particularly, the basin 121).

Preferably, the forces acting on the additional weir 230 keep at least a portion of the top edge 231 of the additional weir 230 (preferably at least weir recess portion 235 of top edge 231 as described below) at or near the top surface of water in the pool 110 during normal operation so that the additional weir 230 only allows the top, debris-containing layer of water in the pool 110 to enter skimmer the opening 135. For example, preferably, at least a portion of the top edge 231 of the additional weir 230 is at or near the top surface of water in the pool 110 when the pool 110 (more particularly basin 121) is filled with water to the top of skimmer opening 135. Preferably, a majority of the surface area of the additional weir 230 is submerged in the pool water during normal operation so that the additional weir 230 inhibits non-debris-containing water from entering skimmer opening 135. Those of ordinary skill will appreciate that such forces will include at least the buoyancy of the additional weir 230. The forces may also include the suction power of the skimmer 100. Optionally, the additional weir 230 includes one or more sealed air jackets 240 to increase its buoyancy. Alternatively, the additional weir 230 may be comprised of foam. The system 200 may be comprised of any suitable material, including without limitation, clear plastic (e.g., clear injection molded plastic). Preferably, the track 210 is comprised of a resilient plastic to prevent deformation.

The track 210 extends at least above, and preferably above and below the skimmer opening 135 so that the top edge 231 of the additional weir 230 has the ability to move at least above (and preferably above and below) the skimmer opening 135 so that the additional weir 230 increases the range of the skimmer 100.

As shown in FIGS. 4-10, unlike U.S. Pat. No. 7,993,515 to Davies, preferably the first system 200 does not block all water from entering the skimmer opening 135.

The first system 200 generally eliminates the need for the skimmer weir 170 as the additional weir 230 is responsible for skimming the top, debris-containing layer of the water in the pool 110. Preferably, the first system 200 further includes a weir fastener 250 (e.g., a clip with two prongs) removably attached to the skimmer weir 170 for immobilizing the skimmer weir 170 at an angle other than 90 degrees relative to the ground (i.e., at a position other than the vertical position 170A). Preferably, the weir fastener 250 has a bottom portion 251 that contacts the top edge 171 of the skimmer weir 170 and a top portion 252 that contacts the top wall 197 of the throat 196 of the skimmer 100, as shown in FIG. 8. In another embodiment, the skimmer weir 170 is removed so that it does not interfere with skimming by first system 200.

A particular shape of the additional weir 230 will now be described. However, it will be understood that the shape described is merely exemplary and that the additional weir 230 may have any suitable shape. Preferably, as shown in FIGS. 4-10, the additional weir 230 curves away from the pool sidewall 120 so that water may be stored (if even for a very short time) between the rear 232 of the additional weir 230 and the skimmer opening 135. Preferably, the additional weir 230 extends between about 1-12 inches into the pool 110 (more particularly, basin 121) so that the additional weir 230 does not interfere with swimmers. In a particular embodiment, as shown in FIGS. 4-10, the additional weir 230 comprises a quarter sphere portion 233 generally in the shape of a quarter of a sphere, and the quarter sphere portion 233 has a generally flat open top 234. Preferably, the diameter 237 of the quarter sphere is generally parallel to the ground, it being understood that a quarter sphere has one diameter. Preferably, the additional weir 230 further includes a weir recess 235 located in the top edge 231 of the additional weir 230. The weir recess 235 may be located adjacent to the lengthwise center 239 of the top edge 231 of the additional weir 230. In such an embodiment, the weir recess 235 is the entry point of water entering beyond the additional weir 230 (and ultimately into the skimmer opening 135). Preferably, the weir recess 235 is not parallel to the pool sidewall 120 so that the weir recess 235 is optimized to capture the clockwise 183 or counter-clockwise circulation of the pool water.

In some embodiments, the additional weir 230 further includes a vacuum release door opening 260 and a vacuum release door 261. The vacuum release door 261 is configured to move between a closed position wherein the vacuum release door 261 closes (more preferably seals) the opening 260 and an open position wherein the vacuum release door 261 allows water to enter through the vacuum release opening 260. Without being bound to any particular theory, it is believed that a purpose of the vacuum release door 261, which is ordinarily in the closed position, is that if a child were to push the top edge 231 of the additional weir 230 above the water level in the pool 110 (more particularly basin 121), a vacuum may be created between the additional weir 230 and the pool sidewall 120 due to suction of the additional weir 230 to the pool sidewall 120 caused by skimmer 100. In addition, when the top edge 231 of the additional weir 230 is pushed above the water level in the pool 110 by the child, the water behind the additional weir 230 (i.e., between additional weir 230 and skimmer 100) will be drained into skimmer opening 135 without being replenished, causing water in the pool 110 to exert pressure on the additional weir 230 without a counter-acting force from water behind the additional weir 230 (because the water behind the additional weir 230 is drained). To alleviate such issues, these forces cause the door 261 to move to the open position, allowing water to enter and destroying the vacuum, thereby releasing the additional weir 230 from the sidewall 120 and relieving water pressure exerted on the additional weir 230.

The vacuum release opening 260 and door 261 are generally the same shape and may be any suitable shape, such as generally circular or rectangular. Preferably, the vacuum release door 261 and opening 260 are located in the lower half of the additional weir 230 so that the door 261 and opening 260 still will be submerged when a child pushes the additional weir 230 upwards, given that a purpose of the door 261 and opening 260 is to allow water to pass through the opening 260 when a child pushes the additional weir 230 upwards. The vacuum release door 261 may use any suitable mechanism to bias the door 261 in the closed position, such as a spring 262 or magnet. If a spring 262 is used, the first system 200 may further include a nylon or plastic bolt 264 that passes through an aperture 267 in the additional weir 230. The aperture 267 is slightly smaller than the shaft of the bolt 264, which when pressed into position becomes rigid and tight and non-moveable. The vacuum release door 261 then slides onto the bolt 264 from the rear side. The forward end 263 of the spring 262 rests against the door 261 and the rear end 266 of the spring 262 rests against a washer 265. A nylon or plastic nut 268 is placed to the rear of the washer 265 so that the washer 265 cannot move rearwardly (i.e., towards the sidewall 120) and the spring 262 applies a force to bias the door 261 in a closed position. In another embodiment, a magnet attached to the door 261 or additional weir 230 is used to bias the door 261 in a closed position. If a magnet is used, the door 261 may be hinged to the additional weir 230.

Optionally, the first system 200 is provided as a kit.

The first system 200 may be installed by any suitable process. Optionally, the process includes:

a) removing skimmer faceplate fasteners 146;

b) placing two tracks 210 on the left and right sides of the skimmer opening 135 so that the track sidewall surfaces abut the faceplate 145, the track lengths 215 are perpendicular to the ground, the track recess surfaces 220 of each track 210 face each other, and the faceplate fastener apertures 147 are aligned with the track fastener apertures 222;

c) inserting the track fasteners 223 through the faceplate fastener apertures 147 and the track fastener apertures 222 so that track 210 is secured to faceplate 145 and the sidewall 120; and d) positioning the additional weir 230 in the track recesses 225 so that additional weir 230 is moveable along track lengths 215.

Steps a) through d) may be performed in any suitable order, including simultaneously. Preferably, the track fasteners 223 are slightly longer than the fasteners 146 that are conventionally used to attach the faceplate 145 to the pool sidewall 120, given that the track fasteners 223 must pass through an additional material, namely the tracks 210. The process may include additional steps, such as removing the skimmer weir 170 or providing a weir fastener 250 and immobilizing the skimmer weir 170 with the weir fastener 250.

Figure 15:
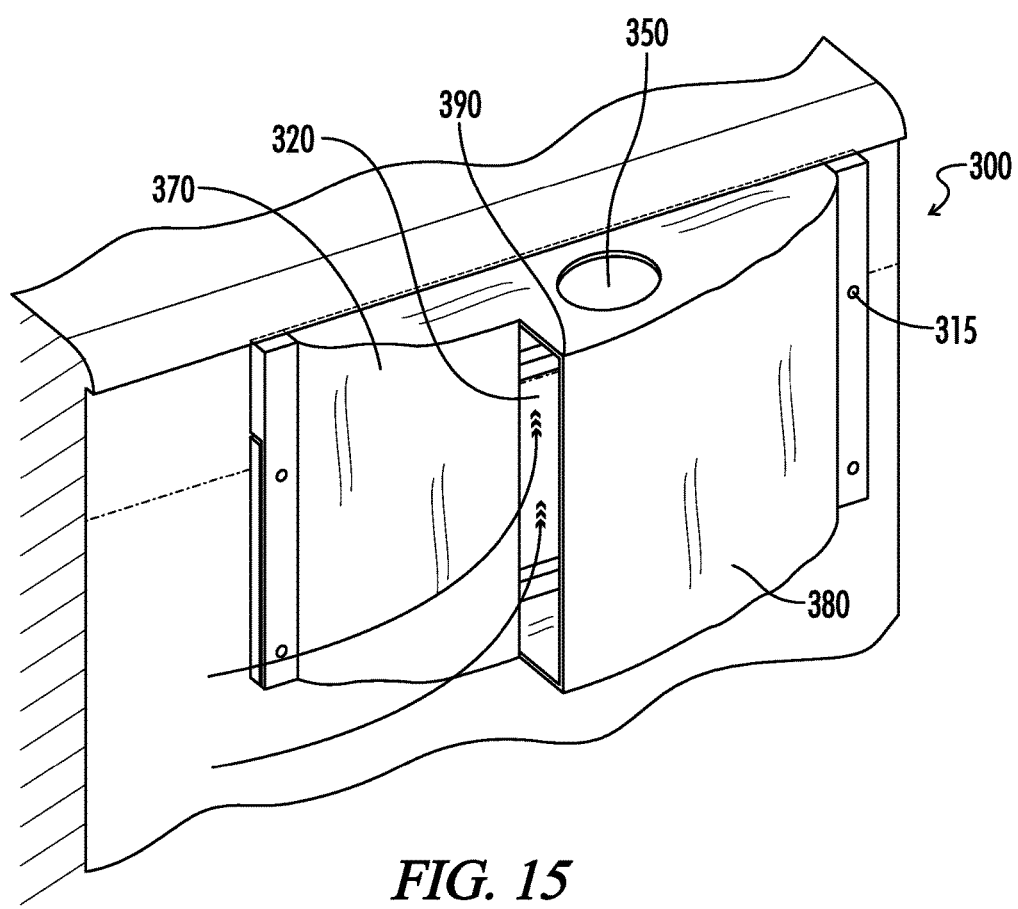
FIG. 15 illustrates a front, perspective view of another embodiment of a deflector of the present invention.

The second system is generally designated by the numeral 300, is illustrated in FIGS. 11-18, and generally relates to a deflector 330 that is external to the skimmer 100. In some embodiments, as illustrated in FIGS. 11-15, the deflector 330 is attached, directly or indirectly, to the sidewall 120 and extends outwards into the pool 110 and above the skimmer opening 135. The deflector 330 further includes an opening 320. The opening 320 may be positioned at or adjacent to the widthwise center of deflector 330, as shown in FIG. 15, or alternatively may be positioned at the left or right side of the deflector 330, as shown in FIGS. 11-14 and 16-18, so that it is positioned to capture water circulating in a clockwise or counter-clockwise fashion (depending on the circulation pattern in the pool 110, more particularly, basin 121). The opening 320 feeds water to the skimmer opening 135 and may be adjacent to the sidewall 120, as shown in FIGS. 11-14. The deflector opening 320 may be any suitable shape, including generally oval-shaped and rectangular. Optionally, the opening 320 is adjacent to the deflector apex 390, which is the furthest point that the deflector 330 extends outward from the sidewall 120, as shown in FIG. 15. Preferably, the deflector 330 extends outward from the sidewall 120 a distance of about 1 inch to about 18 inches so that the deflector 330 does not interfere with swimmers.

As with the prior embodiment, preferably the skimmer weir 170 is immobilized by a weir fastener 250 or the skimmer weir 170 is removed in the second system 300. In some embodiments, the deflector 330 does not move within the pool 110 other than to slightly deform in response to pressure applied to the deflector 330. Preferably, the deflector 330 is comprised of rubber. Preferably, the opening 320 spans substantially the entire height 335 of the deflector 300, as shown in FIGS. 11-18, and at least above the skimmer opening 135. Preferably, the deflector 330 includes fastener apertures 310 located on flat portions 316 on opposite sides (i.e., the left and right sides) of the deflector 330 and the second system 300 further includes fasteners 315 for attaching the deflector 330 directly or indirectly to the sidewall 120. Preferably, the flat portions 316 have a width 317 at least equal to the thickness 148 of the faceplate 145. For example, the flat portions may have a width 317 of at least 0.5 inches and preferably 1-5 inches so the flat portions 316 lay flat on skimmer faceplate 145. Preferably, the deflector 330 includes a solid, water impermeable floor 340, which abuts the sidewall 120 below the skimmer opening 135, and a top opening 350 so that water flows through only the side or top openings 320 and 350—and not from the floor 340. Preferably, the deflector 330 includes a curved portion 360 that extends outward from the sidewall 120. Preferably, the deflector 330 has a height of at least 8 inches (e.g., about 8 inches to about 20 inches).

Optionally, the deflector 330 includes a left flap 370 and a right flap 380 and the opening 320 is located between the left and right flaps 370 and 380, as shown in FIG. 15.

It will be appreciated the second system 300, like the first system 200 increases the range of a pool skimmer 100 and preferably does not block all water from entering the skimmer opening 135, unlike U.S. Pat. No. 7,993,515 to Davies. Rather, the deflector 330 (more particularly openings 320 and 350) feeds water to the skimmer opening 135.

Figure 16:
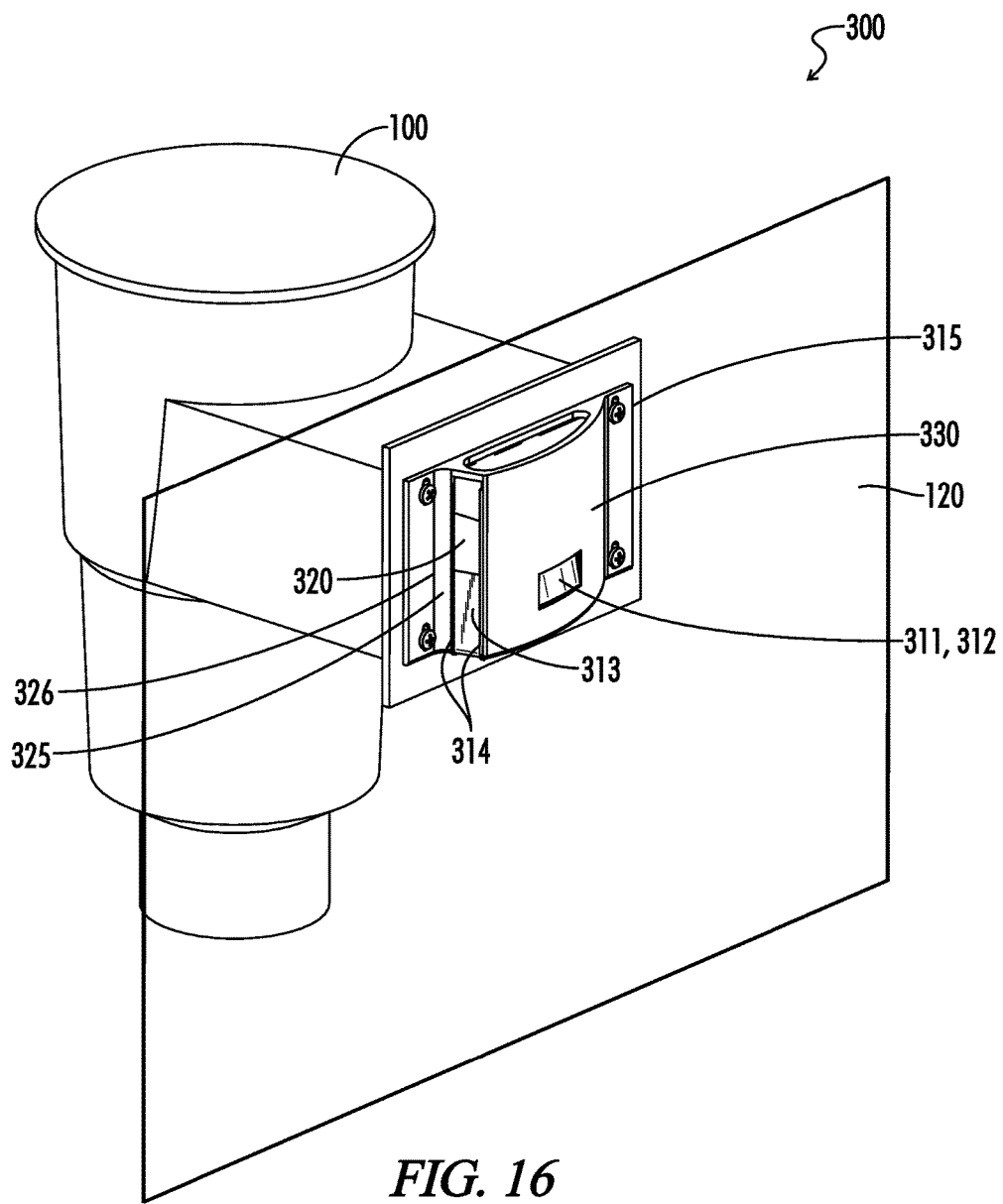
FIG. 16 illustrates a front, perspective view of another embodiment of a deflector of the present invention abutting a pool sidewall; in this embodiment, the deflector includes a weir.

However, unlike the first system 200, which feeds only the top, debris-containing layer to skimmer opening 135, the second system 300, as described above, is less selective and generally feeds any water that is able to enter through the openings 320 and 350 to the skimmer opening 135. To alleviate this, as seen in FIGS. 16-18, the deflector 330 may further include an additional weir 313 that moves vertically in response to changing water levels in the basin 121 and the additional weir 313 at least partially covers the opening 320 so that the deflector 330 is selective in this embodiment and only feeds the top, debris-containing layer of water to the skimmer opening 135. In some embodiments, the additional weir 313 travels along tracks 314 located on opposites sides of the opening 320 and optionally the system 300 further includes a motor 325 for moving the additional weir 313 along the tracks 314 and a power source 326 (e.g., battery and/or solar panels) for powering the motor 325. In some embodiments, the opening 320 has a median width of at least about 1 inch (e.g., about 1 to about 6 inches), more preferably at least about 3 inches (e.g., about 3 to about 6 inches) and a height of from about 4 inches to about 12 inches (more preferably about 7 inches to about 12 inches). Preferably, the size of the opening 320 is relatively narrow to take advantage of the Bernoulli principle but is still large enough to allow debris to flow through. In some embodiments, as illustrated in FIGS. 16-18, the additional weir 313 may be a single piece of plastic that moves like a reverse garage door to close opening 320 (i.e., unlike a typical garage door which moves laterally at the top, the additional weir 313 may move laterally along the floor 340, as best seen in FIG. 17). In other embodiments, the additional weir 313 may be comprised of a series of panels that, for example, fold onto each other at the bottom of opening 320 like an accordion.

In some embodiments, the deflector 330 includes a vacuum release door 311 and vacuum release opening 312 having the same features as described above for the first system 200 (e.g., spring or magnet-operated system). Optionally, if the second system 300 includes an additional weir 313, the vacuum release door 311 and vacuum release opening 312 may be located on the additional weir 313, as shown in FIGS. 16-18.

Optionally, to increase the suction power of the second system 300, the deflector 330 includes a narrow channel behind deflector 330 and in front of skimmer opening 135 that has a smaller cross-sectional area than the cross-sectional area of the opening 320. For example, in some embodiments, the cross-sectional area of the channel is from about 4 square inches to about 36 square inches at its narrowest point, more preferably from about 4 square inches to about 20 square inches. This allows the narrow channel to take advantage of the Bernoulli principle, which holds that velocity of water increases when water flows through a narrow constriction. It has been observed in the inventor's experimentation with similar systems that it is advantageous to locate a narrow constriction further into the pool basin 121 (i.e., further from sidewall 120) because doing so allows the suction power created by the constriction to extend further into the basin 121 (and thereby potentially increase the skimming radius of the skimmer 100). In other words, the suction force decreases as the distance from the constriction increases. In such embodiments, preferably the top of deflector 330 is closed (i.e., lacks top opening 350) and water enters through the opening 320, into narrow channel and then into skimmer opening 135. Optionally, the cross-sectional area of the openings 320 and channel may decrease gradually like a funnel to aid the flow of water and debris therethrough. In other embodiments, as opposed to a weir 313 that moves vertically, the opening 320 has a door (not shown) that can be moved by a user laterally over the opening 320 to partially close the opening 320 and reduce the size of opening 320, and thereby take advantage of the Bernoulli principle.

In some embodiments, as opposed to being attached to the pool sidewall 120, the first and second systems 200 and 300 are attached to the skimmer 100 via an adjustable frame 400, as shown in FIGS. 16-18. The adjustable frame 400 has an adjustable width and adjustable height to accommodate skimmer throats 196 of different sizes, and is generally positioned where skimmer weir 170 is typically positioned (e.g., behind downwardly extending flange 198 if the flange is present). Preferably, the skimmer 100 includes left and right flanges to the left and right sides of the skimmer weir 170 when the skimmer weir 170 is in vertical position 170A, which provides an additional contact area for adjustable frame 400. An example of such a skimmer is the Hayward SP1084 (Hayward Industries, Elizabeth, N.J.). In this embodiment, skimmer weir 170 is typically removed. In some embodiments the adjustable frame was a width of between about 4 to about 14 inches and a height of between about 2 and about 12 inches. The adjustable frame 400 is particularly useful for concrete and gunite pools, which unlike vinyl pools, typically lack a faceplate 145 and would require a significant amount of time to drill a fastener aperture into the sidewall 120. Thus, instead of the fasteners 223, 315 and 520 anchoring the tracks 210, deflector 330 and plate 531 (described below) by attaching to the sidewall 120, the fasteners 223, 315 and 520 instead anchor the tracks 210, deflector 330 and plate 520 by anchoring to the adjustable frame 400. More particularly, the fasteners 223, 315 and 520 pass through apertures 222, 310, and 521 as well as through fastener apertures 402 in the adjustable frame. Again, the adjustable frame apertures 402 may be slotted to allow a user to adjust the system and unused portions of the apertures 402 may be covered so that debris and water does not get trapped in the unused apertures 402. In this embodiment, the adjustable frame 400 is typically prevented from moving forwardly within throat 196 due to the fact skimmers 100 typically have downwardly extending flanges 198 or other narrowings to prevent the skimmer weir 170 from over-rotating beyond the vertical position 170A. And the adjustable frame 400 is typically prevented from moving rearwardly within throat 196 due to the fact that tracks 210, deflector 330 and plate 531 abut the sidewall 120. The adjustable frame 400 may be generally rectangular, include four sides 401 and may include adjustment knobs 403 on each side 401 to allow a user to adjust the frame's height and width, as shown in FIGS. 18-21. In some embodiments, the adjustment knobs (e.g., nuts) 403 may themselves move along threaded rod 408 and the knobs 403 may push against corner pieces 404, 405, 411 and 412 and cause the distance between the pieces 404, 405, 411 and 412 to increase or decrease (thereby increasing or decreasing the width or height of frame 400). In other embodiments, as shown in FIG. 19B, each side 401 of the adjustable frame 400 includes a knob 403 having one end 413 attached to a right hand screw 408 and the other end 414 attached to a left hand screw 409 and each screw 408 and 409 is received in a threaded aperture 406 of a corner piece 404, 405, 411 and 412 so that rotation of the knob 403 in one direction (e.g., clockwise) rotates the right hand and left hand screws 408 and 409 further into both corner pieces of the side (and hence decreases the width of the frame 400) and rotation of the knob 403 in another direction (e.g. counterclockwise) rotates the right hand and left hand screws 408 and 409 out of the corner pieces of the side (and hence increases the width of the frame 400).

Optionally, the second system 300 is provided as a kit.

The second system 300 may be installed by any suitable process. Optionally, the process includes:

a) removing skimmer the faceplate fasteners 146;

b) positioning the flat portions 316 so they abut the faceplate 145 and the faceplate fastener apertures 147 are aligned with the deflector fastener apertures 310; and c) inserting the deflector fasteners 315 through the faceplate fastener apertures 147 and the deflector fastener apertures 310 so that deflector 330 is secured to the faceplate 145 and sidewall 120.

In other embodiments, the process includes:

a) removing skimmer weir 170;

b) positioning the adjustable frame 400 into the throat 196 and adjusting the frame's height and width so that the adjustable frame 400 cannot move forwardly within the throat 196 (i.e., towards sidewall 120 by, for example, placing the adjustable frame 400 in the same location vacated by the skimmer weir 170);

c) positioning the deflector 330 so that the deflector rear faces, preferably abuts, the sidewall 120 and the deflector fastener apertures 310 are aligned with the expandable frame apertures 402; and d) inserting the deflector fasteners 315 through the deflector fastener apertures 310 and the frame apertures 402 so that deflector 330 is secured to the frame 400.

The above steps may be performed in any suitable order, including simultaneously, and may include additional steps (e.g., the first method may also include removing the skimmer weir 170 or providing a weir fastener 250 and immobilizing the first weir 170 with the weir fastener 250.). Preferably, in the first method, the deflector fasteners 315 are slightly longer than the fasteners 146 that are conventionally used to attach the faceplate 145 to the pool sidewall 120, given that the deflector fasteners 315 must pass through an additional material, namely the deflector 330. Preferably, for the second method, the deflector fasteners 315 have a length of from about 6 to about 18 inches.

The present disclosure also provides a third system 500 that is similar in design and function as the first system 200. In some embodiments, the third system 500 includes:

a) a swimming pool 110 comprising a basin 121 configured to hold water and a plurality of sidewalls 120 defining a perimeter of the basin 121;

b) a skimmer 100 comprising a skimmer opening 135 located in one of the sidewalls 120, the skimmer opening 135 in fluid communication with the basin 121; and c) a weir assembly 532 located in the basin 121 and adjacent to the skimmer opening 135, the weir assembly 532 abutting the one sidewall 120 and comprising a plurality of fastener apertures 521 and an additional weir 530 located in the basin 121, the additional weir 530 configured to move in response to changing water levels in the basin 121, the weir assembly 532 configured to deliver water from the basin 121 to the skimmer opening 135.

Optionally, the additional weir 530 is configured to move above the skimmer opening 135 so that water located above the skimmer opening 135 can enter the skimmer 100. Optionally, the weir assembly 532 further comprises a vacuum release door 533 and a vacuum release opening 534, the vacuum release door 533 configured to move between a closed position wherein the vacuum release door 533 closes the vacuum release opening 534 and an open position wherein the vacuum release door 533 allows water located in the basin 121 to enter through the vacuum release opening 534 and enter the skimmer opening 135. (Again, the vacuum release door and opening 533 and 534 may have the same components as described with the first system 200). Preferably, the vacuum release door and opening 533 and 534 are external to the skimmer 100 (i.e., located in basin 121) and optionally, the vacuum release door 533 is located in the weir 530. Optionally, the weir assembly 532 further comprises a hinge attaching the vacuum release door 533 to the weir assembly 532 and the vacuum release door 533 is moveable (more particularly, pivotable) along the hinge. Optionally, the weir assembly 532 comprises a top half and a bottom half and the vacuum release opening 534 is located in the bottom half of the weir assembly 532. Optionally, the weir assembly 532 has a height of at least about 4 inches and a width of at least about 4 inches, e.g., a height of from about 4 to about 14 inches and a width of from about 4 inches to about 24 inches.

Optionally, the weir assembly 532 further comprises a plate 531 abutting the pool sidewall 120 (e.g. directly abutting the sidewall 120 or abutting faceplate 145 attached to the sidewall 120), the plate 531 comprising the plurality of fastener apertures 521, the plate 531 preventing water in the basin 121 from entering the skimmer opening 135 without passing over the weir 530. Optionally, the plate 531 comprises a flat, rear portion abutting the one sidewall 120. Optionally, as shown in FIGS. 21-24, the weir assembly 530 includes a central plate, a left plate and a right plate if the skimmer opening 135 is large, as is the case with skimmers such as the Hayward SP1091 widemouth (Hayward Industries, Elizabeth N.J.), whose opening is 11 and ⅝ inches wide. In other embodiments, e.g., with skimmers 100 such as the Hayward SP1084 (whose opening is 7⅝ inches wide), the skimmer opening 135 is relatively small and only a central plate is needed. Optionally, the plate 531 further comprises a plate opening 535 located between the weir 530 and the skimmer opening 135, the plate opening 535 configured to feed water to the skimmer opening 135, and the weir 530 at least partially covers the plate opening 535. Optionally, the weir 530 further comprises a top 536, the top 536 comprising an opening 537 configured to feed water from the basin 121 to the plate opening 535. Optionally, the top opening leads to a narrow channel whose cross-sectional area decreases gradually like a funnel to aid the flow of water and debris therethrough and increase the suction power of the system 500 through the Bernoulli principle described above. Optionally, the top opening 537 has a width of, for example, from about 1 to about 6. Optionally, instead of feeding water directly to the skimmer opening 135, the system 500 includes a pipe/tube 722 system, similar to that described below and illustrated in FIGS. 26, 30 and 32 and the pipe 722 has a first end attached to the plate 531 (adjacent to, preferably surrounding, the plate opening 535 and in fluid communication with the plate opening 535) and a second end located in the throat 196.

Optionally, the system 500 further comprises a plurality of fasteners 520 attaching the weir assembly 532 (more particularly, the plate 531) to the one sidewall 120. Optionally, the system 500 further comprises a pool pump 190 in fluid communication with the skimmer 100, the skimmer 100 further comprises a throat 196 and a water exit aperture/drain 199 located below basket 160 that feeds water from the skimmer 100 to the pool pump 190, the throat 196 located between the skimmer opening 135 and the water exit aperture/drain 199, and the system 500 further comprises an adjustable frame 400 located in the throat 196, as described above.

Figure 21:
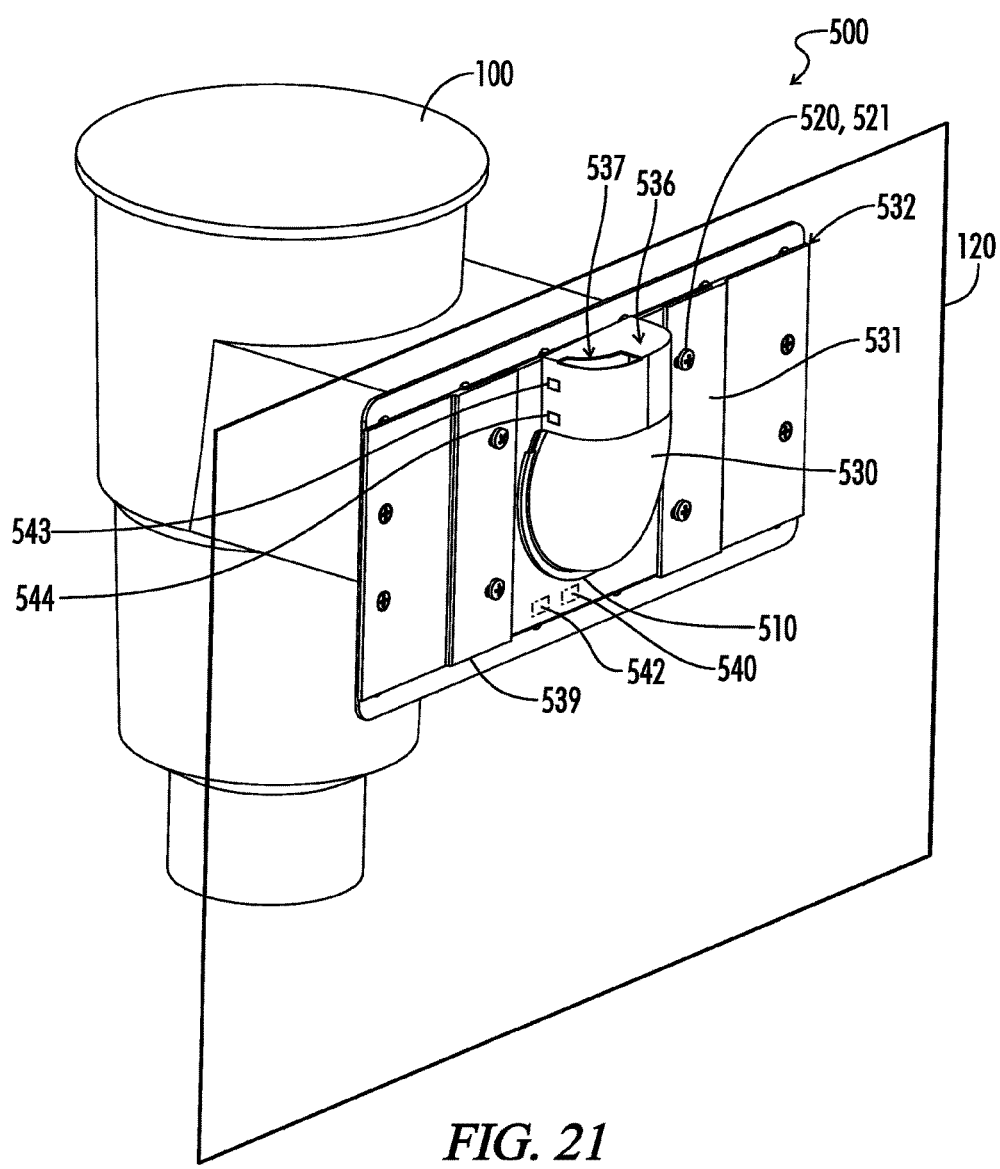
FIG. 21 is a front, perspective view of a weir assembly that abuts a pool sidewall.
Figure 22:
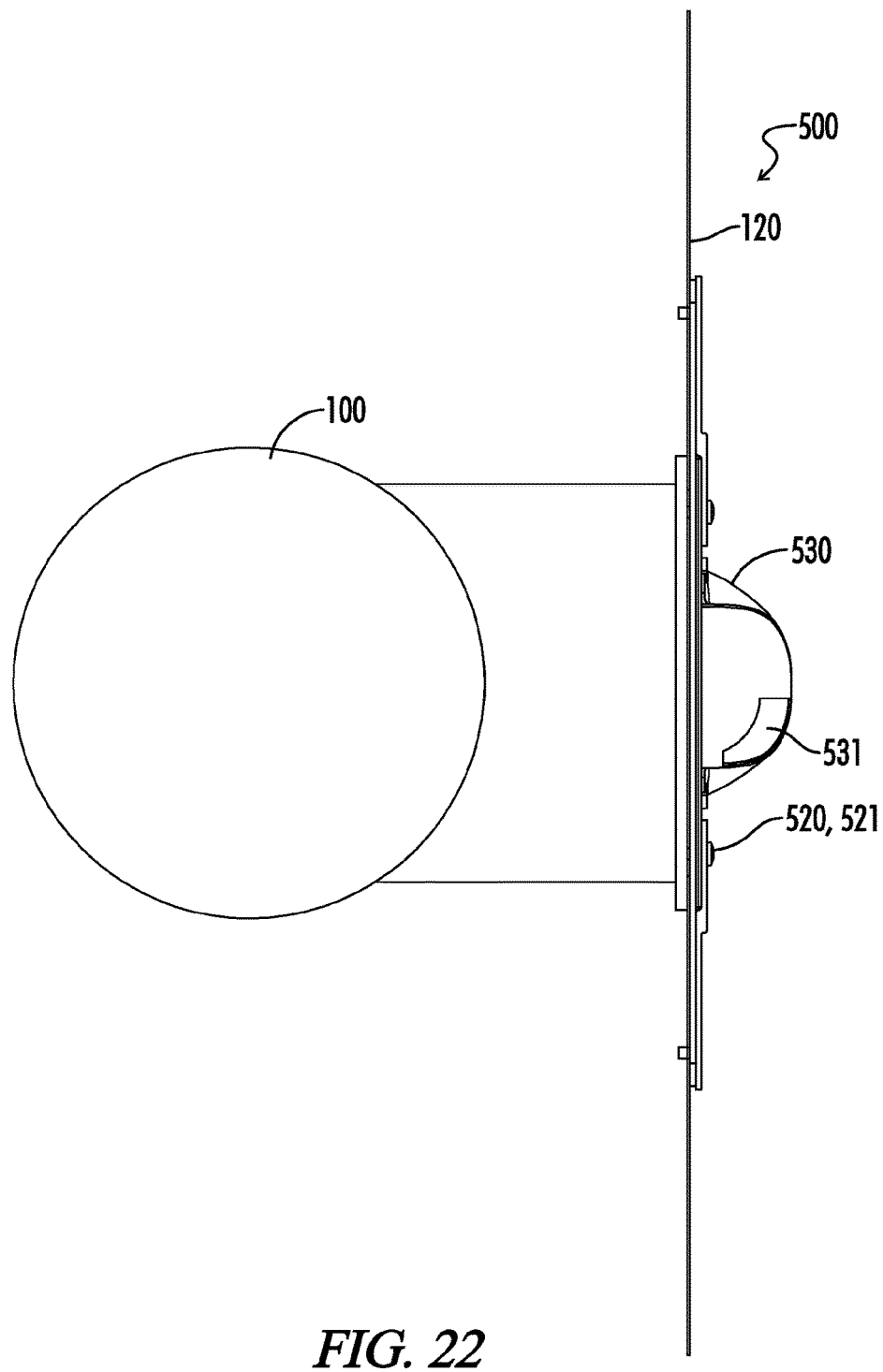
FIG. 22 is a top, plan view of the weir assembly of FIG. 21.
Figure 23:
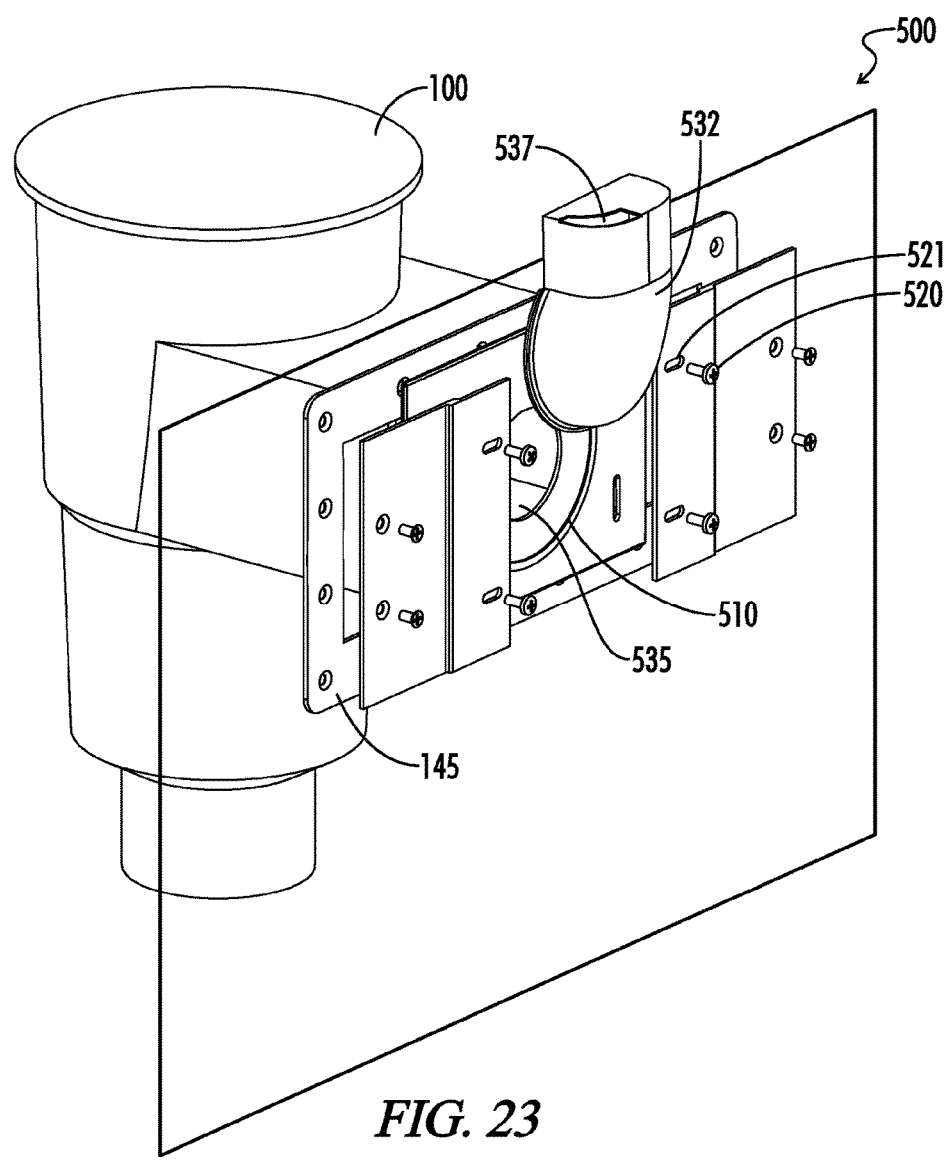
FIG. 23 is a front, exploded, perspective view of the weir assembly of FIG. 21.
Figure 24:
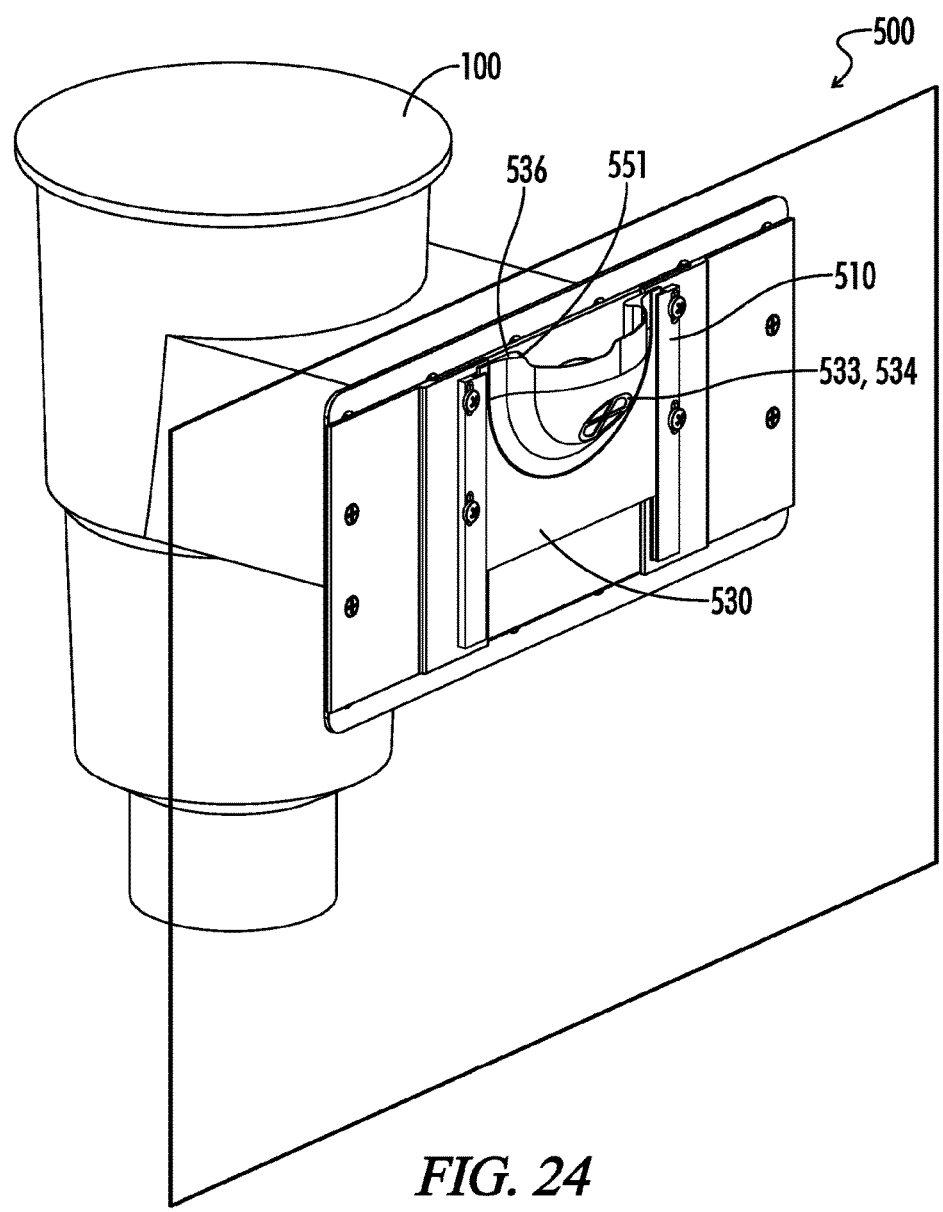
FIG. 24 is a front, perspective view of another embodiment of a weir assembly.
Figure 25:
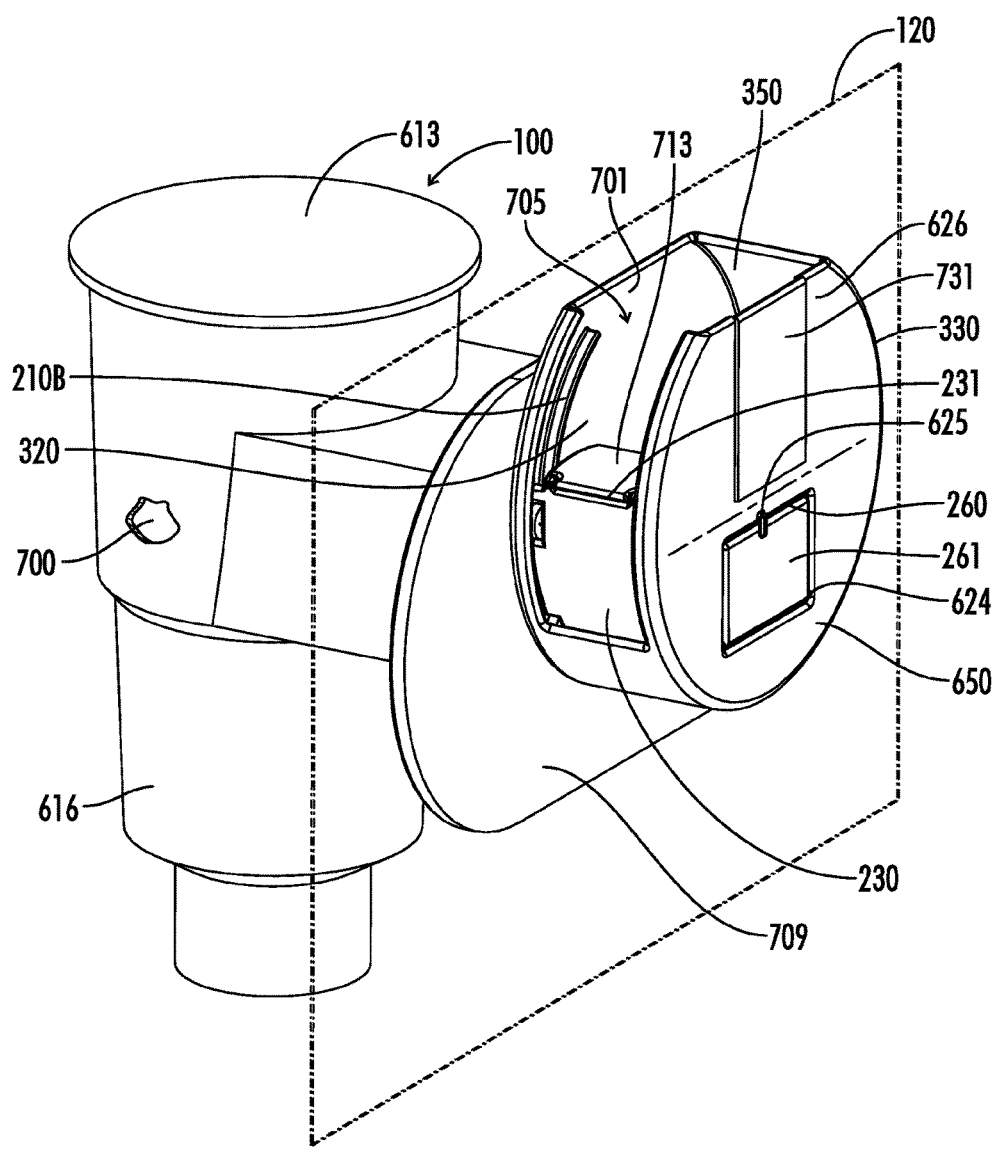
FIG. 25 is a left side, perspective view of a system of another embodiment of the present invention for increasing the range of a pool skimmer.
Figure 26:
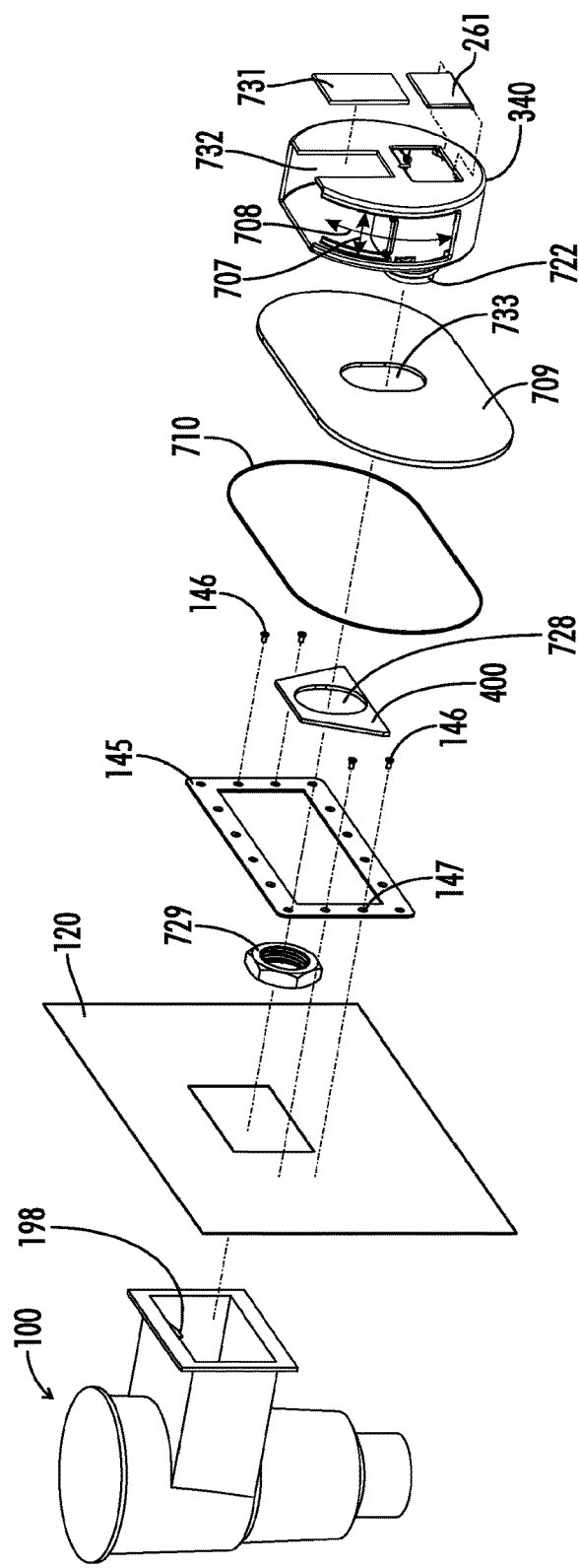
FIG. 26 is a left side, perspective, exploded view of the system of FIG. 25.
Figure 27:
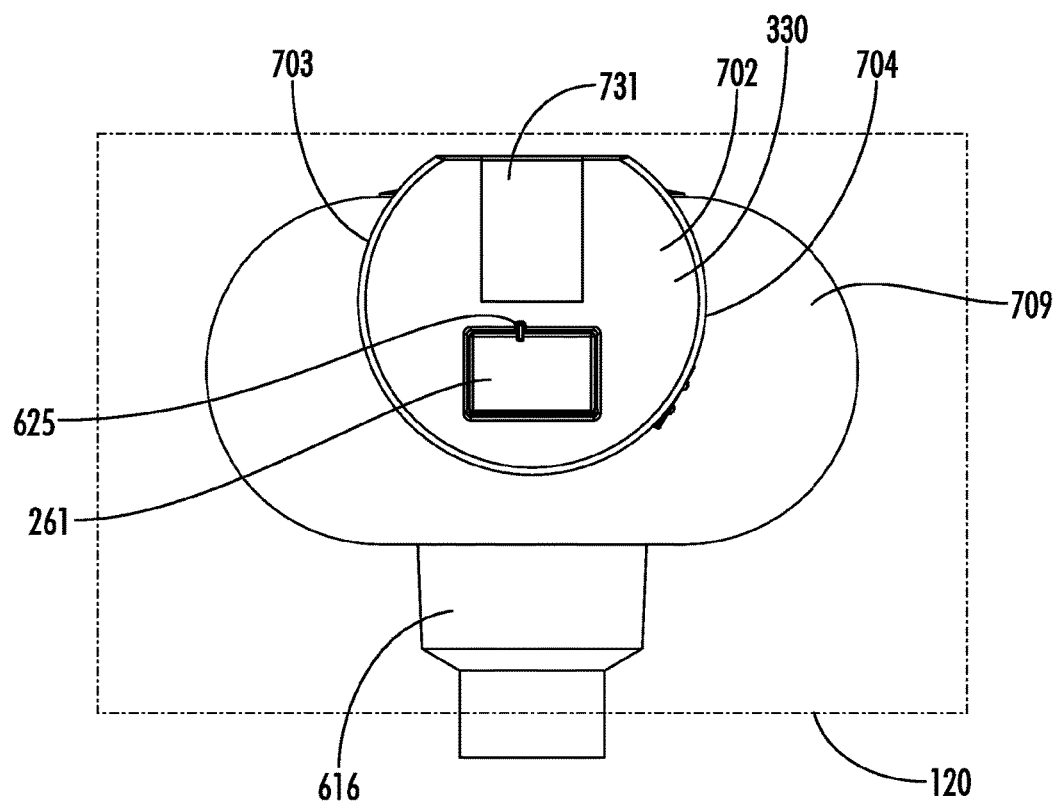
FIG. 27 is a front, elevation view of the system of FIG. 25.

Optionally, the system 500 further comprises a plurality of fastener apertures 402 located in the adjustable frame 400 and a plurality of fasteners 520 attaching the adjustable frame 400 to the weir assembly 532, each of the plurality of fasteners 520 passing through a fastener aperture 521 located in the weir assembly 532 and a fastener aperture 402 located in the adjustable frame 400. Optionally, the weir assembly 532 further comprises a floor 539 located at a bottom of the weir assembly 532, the floor 539 abutting the one pool sidewall 120, the floor 539 configured to inhibit water located in the basin 121 from entering the skimmer opening 135 from below the floor 539. Optionally, the weir assembly 532 further comprises a motor 540 configured to move the weir 530 in response to changing water levels in the basin 121. Optionally, the weir assembly 132 further comprises a track 510 (e.g., one or more tracks) configured to allow the weir 530 to move in response to changing water levels in the basin 121. The track(s) 510 may be generally perpendicular to the ground, in which case the weir 530 moves vertically up and down, as shown in FIG. 24. Alternatively, the track 510 may be circular, semi-circular or U-shaped, as shown in FIGS. 21 and 23, in which case the weir 530 rotates around the circular, semi-circular or U-shaped track 510. Optionally, the system 500 further comprises a power source 542 (e.g., batteries and/or solar panels) configured to power the motor 540. Optionally, the top 536 of the weir assembly 532 comprises a solar panel configured to power the motor 540. Optionally, the system 500 further comprises a water level sensor 543 configured to sense the water level in the basin 121, and a processor 544 connected to the water level sensor 543 and configured to move the weir 530 in response to data concerning the water level in the basin 121 received from the water level sensor 543. Optionally, the basin 121 is filled with water, and the weir 530 comprises a top 536 and a float 551 located adjacent to the top 536, the float 551 configured to allow the top 536 of the weir 532 to float in the water. Optionally, the weir 532 is buoyant in water.

The Embodiments of FIGS. 25-32

FIGS. 25-32 illustrate another embodiment of a system for increasing the range of a pool skimmer. As will be appreciated, the system of FIGS. 25-32 is similar in both design and function to the system of FIGS. 16-20.

Referring further to FIGS. 25-32, the system includes a) a swimming pool 110 comprising a basin 121 configured to hold water and a plurality of sidewalls 120 defining a perimeter of the basin 121;

b) a pool skimmer 100, the pool skimmer 100 comprising a skimmer opening 135 located in one of the sidewalls 120 and a skimmer interior 700; and c) a deflector 330 adjacent to the sidewall 120 comprising the skimmer opening 135 (preferably directly in front of the skimmer opening 135) and extending into the basin 121, the deflector 330 having a rear 701 facing the skimmer opening 135 and comprising a first opening 706 in fluid communication with the skimmer 100 and configured to feed water through the skimmer opening 135, a front 702 opposite the rear 701, a left side 703, a right side 704, and an interior 705 defined by the front 702, the rear 701, and the left and right sides 703 and 704, at least one of the front 702, the left side and the right side 703 and 704 comprising a second opening 320 configured to deliver water from the pool basin 121 to the deflector interior 705 and the first opening 706, the second opening 320 having a median width 707 of at least about 1 inch and a height 708 of at least about 1 inch. In some embodiments, the deflector rear 701 is open (like the deflector rear of FIG. 12). In other embodiments, the deflector rear 701 is closed, except for the first opening 706 (as shown in FIGS. 25-32). In FIGS. 25-32 (like FIGS. 16-24), the pool sidewall 120 is shown as transparent for ease of viewing the components of the system. Optionally, the deflector 330 extends into the basin 121 from about 1 inch to about 18 inches, more preferably from about 1 inch to about 12 inches, even more preferably from about 1 inch to about 6 inches so that the deflector 330 does not interfere with swimmers. In other words, preferably, the deflector front 702 is located no more than about 18 inches, preferably no more than about 12 inches and even more preferably no more than about 6 inches from the sidewall 120.

Preferably, the first opening 706 is configured to deliver water through the skimmer opening 135 by feeding water through a tube/pipe 722 as best seen in FIGS. 29-32. The tube/pipe 722 preferably extends from the deflector rear 701 and is adjacent to the first opening 706. The tube/pipe 722 optionally is generally cylindrical in shape, has an open front end 723 (which preferably surrounds first opening 706), an open back end 724, a hollow interior 725 in fluid communication with the first opening 706, a wall 726 forming the outside of the pipe/tube 722, an outer diameter of from about 1 inch to about 5 inches (more preferably about 2.5 inches to about 4 inches), a length extending from the front end 723 to the back end 724 of from about 1 inch to about 14 inches (more preferably about 2 inches to about 8 inches). Optionally, the tube/pipe 722 is threaded with threads 727 so that it can receive a nut 729 (as explained below). Optionally, an additional tube/pipe (not shown) is configured to attach to the back end 724 of the tube/pipe 722 for skimmers 100 having a longer throat 196. For example, some skimmer throat 196 can be as short as few inches and others can be over 6 inches in length. The front and back end 723 and 724 of the tube/pipe 722 are both open so that the tube/pipe 722 delivers water and debris from the deflector interior 705 into the throat 196 and ultimately through the basket 160 and pump 190. The first opening 706 can have any suitable size, and optionally, has the same height and width as the tube/pipe 722 (e.g., from about 1 inch to about 5 inches). Preferably, the surface area of the first opening 706 is at least 3.14 square inches (the same surface area of a 2 inch diameter pipe) so that sufficient water flows to the pool pump 190 (which is in fluid communication with the first opening 706) so the pump 190 does not draw air.

Figure 28:
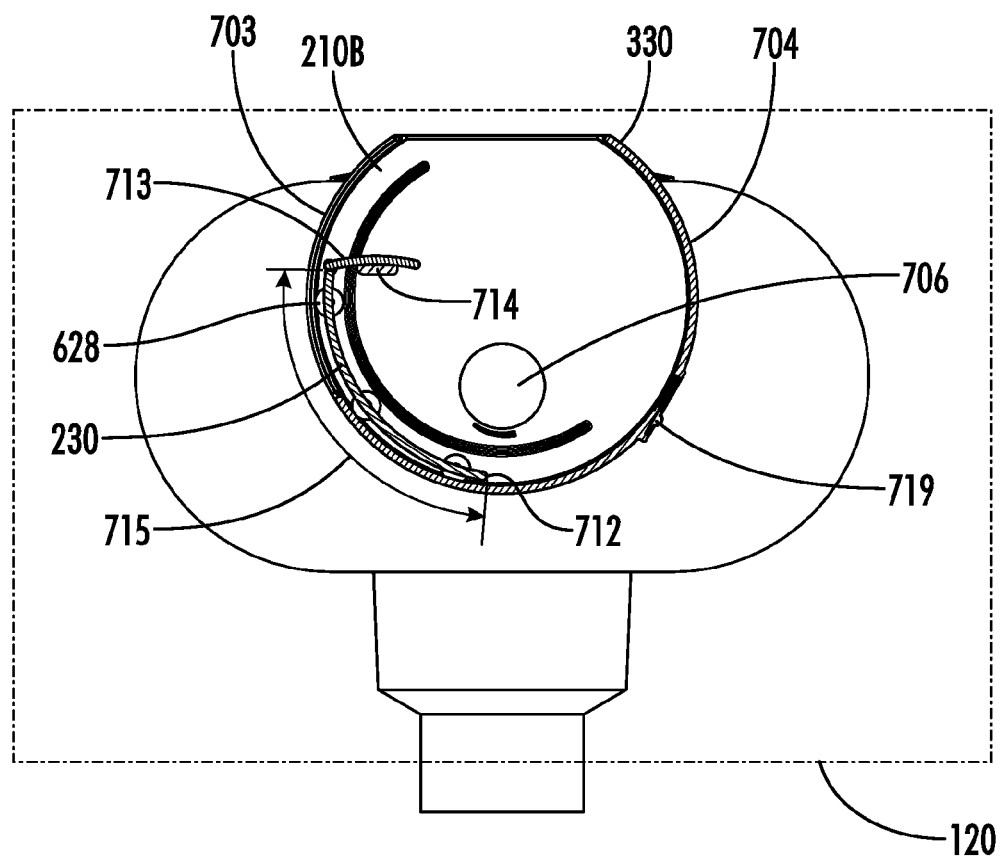
FIG. 28 is a cross-sectional view of the system of FIG. 27, taken along line 28-28 of FIG. 27.
Figure 29:
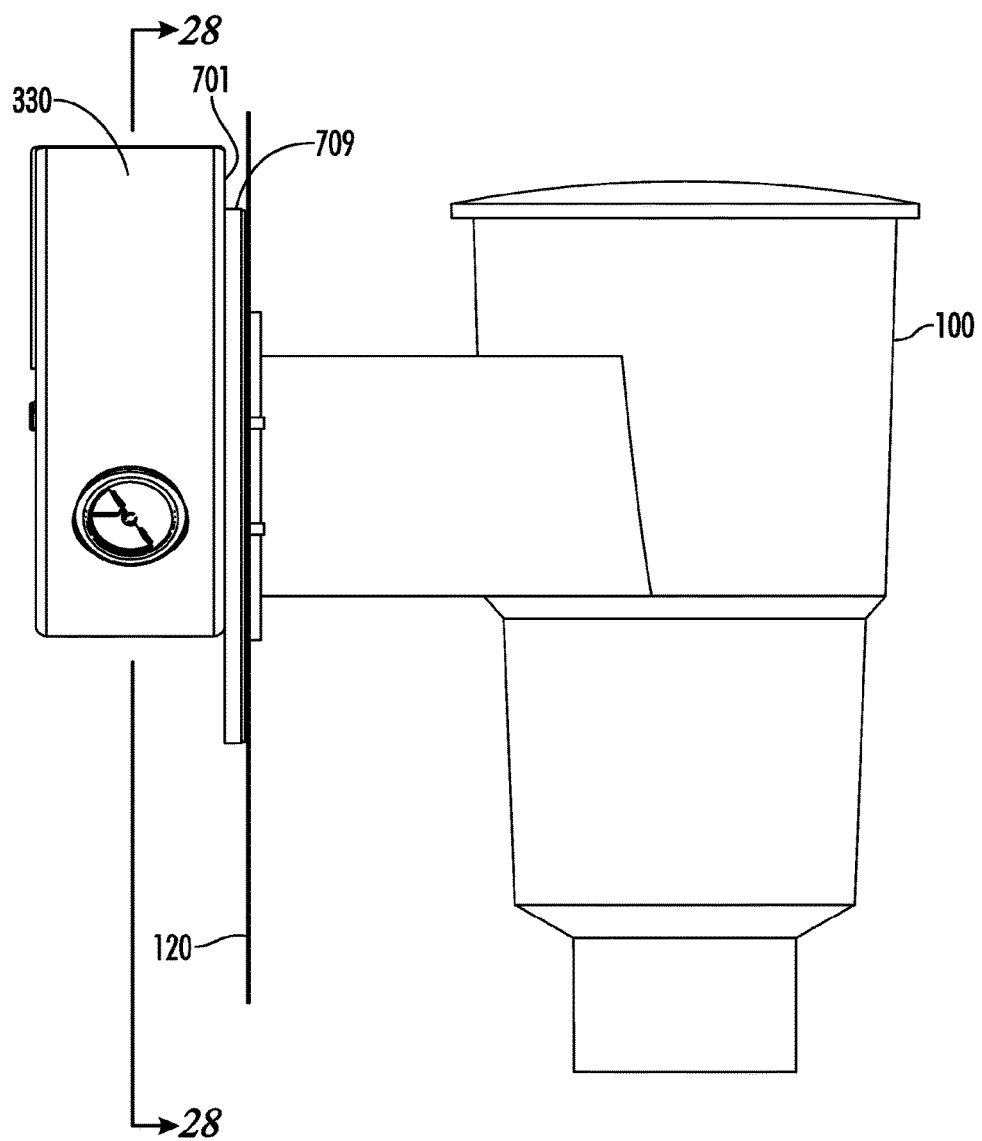
FIG. 29 is a right side, elevation view of the system of FIG. 25.
Figure 30:
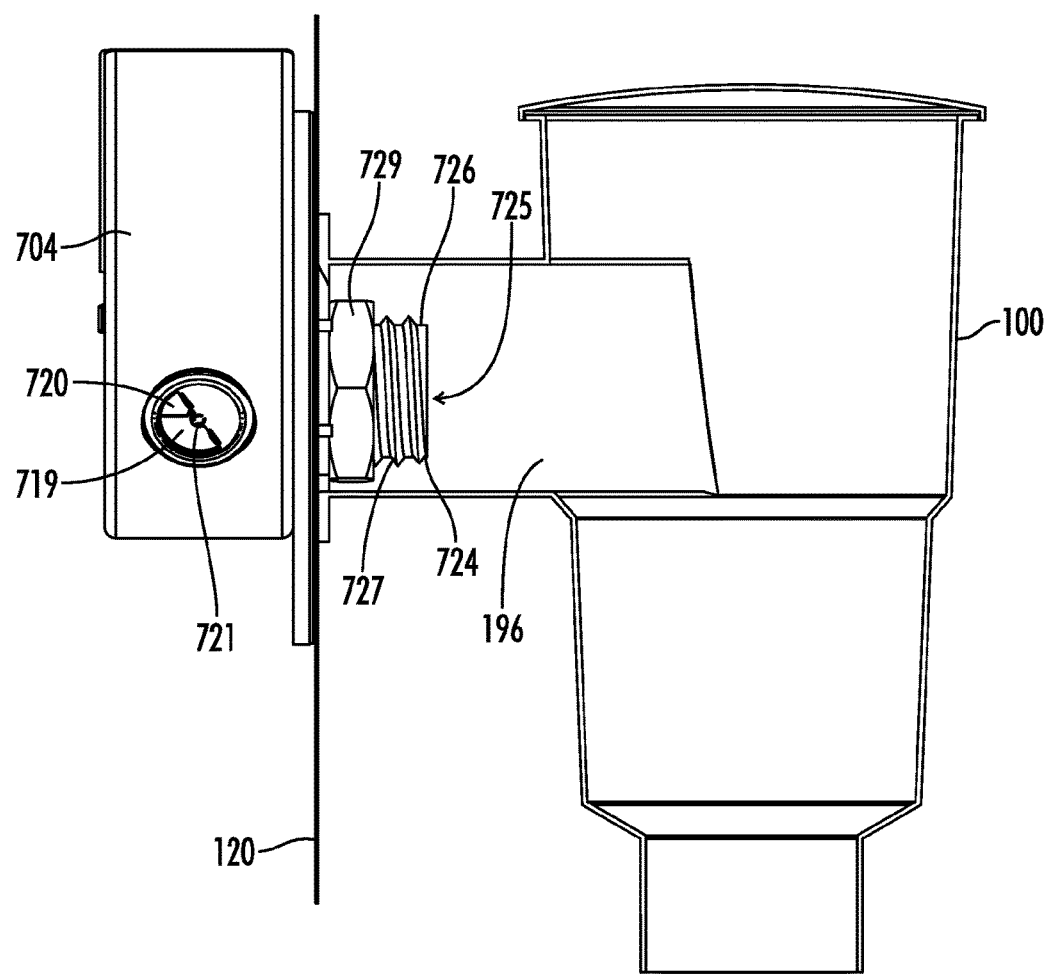
FIG. 30 is a right side, partially cut-away view of the system of FIG. 25; the skimmer is partially transparent to better illustrate the threaded tube/pipe and nut.
Figure 31:
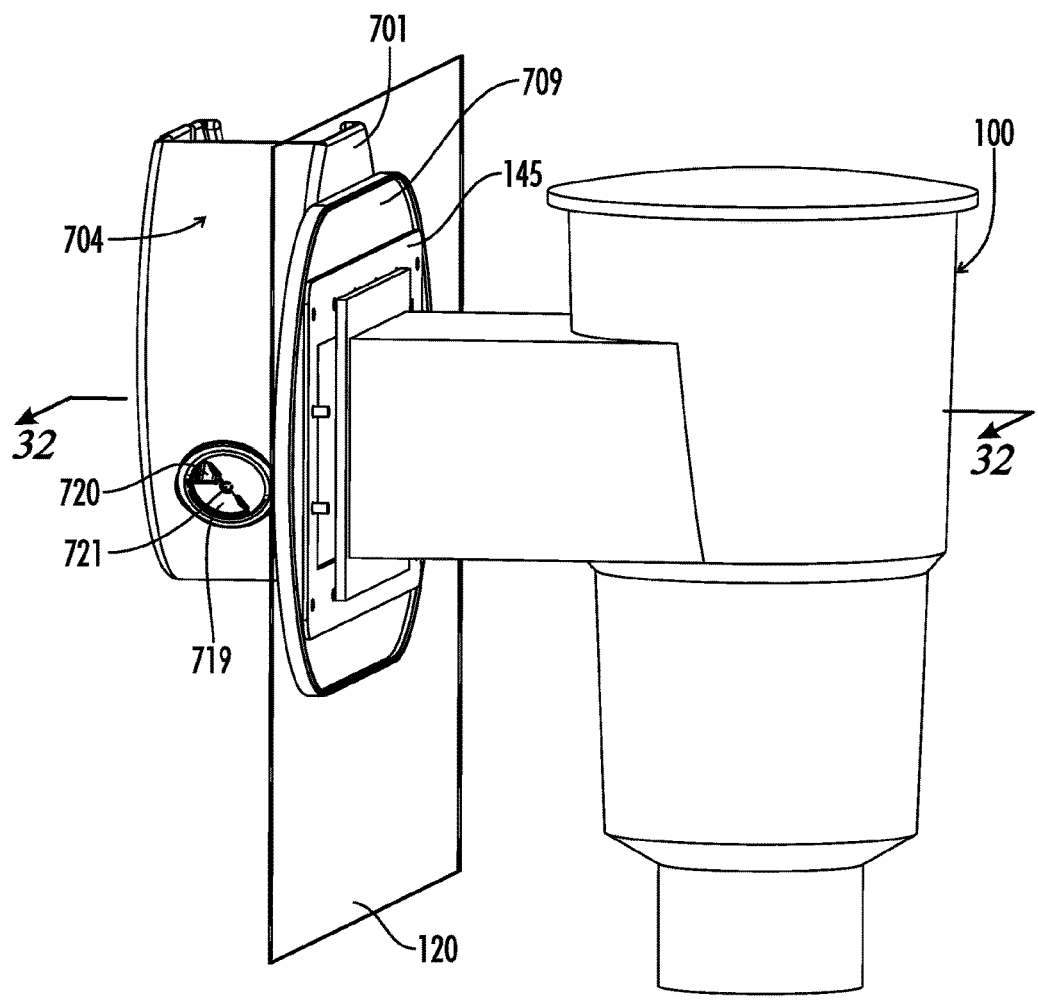
FIG. 31 is a right side, perspective view of the system of FIG. 25.

Optionally, the second opening 320 has a height of from about 4 inches to about 12 inches (more preferably about 7 inches to about 12 inches) and a median width of from about 1 inch to about 6 inches. Optionally, the second opening 320 extends above the skimmer opening 135. The second opening 320 may extend above the skimmer opening 135 at least about 1 inch, preferably about 2 to about 6 inches. Optionally, the rear 701 of the deflector 330 is substantially flat. Optionally, the rear 701 of the deflector 330 is attached to a plate 709 comprising an aperture 733 for receiving the pipe/tube 722 and a gasket 710 abutting the one sidewall 120 so that the plate 709 creates a seal so that water must enter through the second opening 320 (instead of entering directly through the skimmer opening 135). Optionally, the deflector 330 further comprises an additional weir 230 configured to at least partially cover the second opening 320, the additional weir 230 configured to move upwards and downwards in response to changing water levels in the pool basin 121. Optionally, the additional weir 230 is configured to move above the skimmer opening 135. Optionally, the additional weir 230 is configured to move upwards and downwards in an arc in response to changing water levels in the pool basin 121. Optionally, the arc is circular, elliptical, ovoidal in shape and/or forms part of an circle, ellipse or oval. Optionally, the deflector 330 further comprises at least one track 210 adjacent to the second opening 320 and the additional weir 230 is configured to move along the track 210. Optionally, the deflector 330 is generally circular. Optionally, the additional weir 230 further comprises at least one wheel 627/628 and the at least one wheel 627/628 is configured to move along the track 210. Optionally, the deflector 330 further comprises two tracks 210 (e.g., a front track 210A and a rear track 210B) located on opposite sides of the second opening 320, and the additional weir 230 further comprises at least two wheels 627/628 (e.g., two to six wheels 627/628) distributed on opposite sides of the additional weir 230 (e.g., the front and rear sides) and each wheel 627/628 is configured to move along a track 210, as best seen in FIG. 28. It has been observed that the movement of the additional weir 230 performs much better with the wheels 627/628 than without the wheels, due to reduced friction. Preferably, the wheels 627/628 are bearings. If included the bearings may include a plurality of balls (e.g., stainless steel or glass) located around a track that is made of a different material. Such bearings are known in the art and include the replacement C60 bearings for the POLARIS 280 robotic pool cleaner (available from Zodiac Marine & Pool, Vista Calif.) as well as KMS Bearings, Anaheim Calif. Optionally, the tracks 210 are curved and each track 210 forms an arc, as best seen in FIGS. 28 and 32, so that the additional weir 230 moves upwardly and downwardly along an arc in response to changing water levels in the pool basin 121. In some embodiments, the second opening 320 is on the left side 703 of the deflector 330, and the deflector 330 further comprises a third opening (not shown) on the right side 704 of the deflector 330, the second 320 and third openings each have a height of from about 4 inches to about 12 inches and a median width of from about 1 inch about 6 inches, and the deflector 330 further comprises two tracks 210 adjacent to the second opening 320 and two tracks (not shown) adjacent to the third opening. This embodiment, though not shown, provides two options: first, the left and right side 703 and 704 can each have an additional weir 230, which allows water to enter the deflector interior 705 through the second 320 and third openings, simultaneously; alternatively, the embodiment may include only one additional weir 230, and only one of the second 320 and third openings is exposed at a time, in which case, the weir 230 moves along the tracks 210 adjacent to the exposed opening and the opening on the other side is blocked by a moveable plate or piece of foam that covers this opening. The alternative approach is preferable in some respects, as it allows a user to choose to have water enter through either the left side 703 or right side 704 of the deflector 330 (i.e., the second 320 or third opening), depending on the water circulation in the user's pool 110. Preferably, the additional weir 230 is buoyant in water (meaning that the additional weir 230 does not fully sink in water) so that the additional weir 230 adjusts to changing water levels in the pool basin 121. Optionally, the additional weir 230 comprises a top 231, a bottom 712, a tab 713 extending from the top 231, and a float 714. Optionally, the float 714 is attached to the tab 713. Optionally, the float 714 comprises foam. It has been observed that good results are achieved (in terms of the additional weir 230 moving in response to changing water levels in the basin 121) when the float 714 is attached to the tab 713, the tab 713 is immobile and the tab 713 is approximately perpendicular (e.g, about 60 to 90 degrees) to the water surface as the additional weir 230 moves around the tracks 210 so that the tab 713 floats like a boat. In such case, water flowing through the second opening 320 pushes the additional weir 230 downward so that the tab 713 is located about 2 inches underwater and only the top layer (2 inches) of pool basin 121 water enters through the second opening 320 when the pump 190 is turned on. In such embodiments, when the pump 190 is turned off, the additional weir 230 moves upwardly to inhibit the debris-containing water in the skimmer 100 from flowing through the second opening 320 when the pump 190 is turned off. As with the prior embodiments, the purpose of the additional weir 230 is that most of the debris in the pool basin 121 water is located on or just slightly below the surface (e.g., within about 2 inches of the surface), and thus, the additional weir 230 allows this top layer of water to enter the second opening 320 so that it can reach the pump 190 and filtration system and the sub-surface water is blocked by the additional weir 230. In other embodiments, instead of relying on a floatation system to move the additional weir 230, the system of FIGS. 25-32 includes a water level sensor 543, a power source 542, a processor 544 and a motor 540 to move the second weir 230 in response to changing water levels in the basin 121, as described with respect to system 500. Optionally, the additional weir 230 is curved along its height/length 708, as shown in FIGS. 25-26, 28 and 32. In some embodiments, instead of using a track 210, the deflector 330 further comprises a hub (not shown) and a spoke (not shown), the spoke having a first end attached to the hub and a second end attached to the additional weir 230, and the hub is configured to rotate about a pivot point (which is preferably centrally located on the front 702 or rear 701 of the deflector 330) so that the attached additional weir 230 similarly rotates about the pivot point (like a ferris wheel), which is an alternate way to allow the additional weir 230 to move upwardly and downwardly along an arc in response to changing water levels in the basin 121 that, as with the embodiment above, minimizes friction. Optionally, the deflector 330 further comprises a vacuum release door 261 and a vacuum release opening 260 similar to that illustrated in FIGS. 4-7, 9-10, 16, 17, and 24. Like these prior embodiments, the vacuum release door 261 is configured to move between a closed position wherein the vacuum release door 261 closes the vacuum release opening 260 (e.g., at least partially covers/closes the vacuum release opening 260) and an open position wherein the vacuum release door 261 allows water located in the basin 121 to enter through the vacuum release opening 260 and enter the deflector interior 705 and the first opening 706. As with the prior embodiments, it has been observed that, in the event that the additional weir 230 is intentionally pulled above the top of the water located in the basin 121 (e.g., by a mischievous child), the vacuum release door 261 opens and allows water located in the basin 121 to bypass the second opening 320, which is now covered by the intentionally raised additional weir 230, so that the pump 190 does not draw air. It has also been observed that the vacuum release door 261 equalizes the water pressure pressing on the deflector 330 from the deflector interior 705 and the pool basin 121 so that the additional weir 230 falls naturally to just below the top of the water located in the basin 121 when the person stops pulling the additional weir 230 upwards. Optionally, the deflector 330 further comprises a hinge 624 attaching the vacuum release door 261 to the deflector 330 and the vacuum release door 261 is moveable along the hinge 624. Optionally, the deflector comprises a tab 625 located exterior to the vacuum release door 621, the tab 625 configured to prevent the vacuum release door 261 from rotating beyond the tab 625 so that the vacuum release door 261 does not rotate beyond the vertical. Optionally, the deflector 330 comprises a top half 626 and a bottom half 650 and the vacuum release opening 260 is located in the bottom half 650 of the deflector 330, which allows the vacuum release opening 260 to be in the water even when the water in the basin 121 is relatively low. Optionally, the deflector 330 further comprises a magnet to bias the vacuum release door 261 in the closed position. Optionally, in addition to the vacuum release door 261 and the vacuum release opening 260, the deflector 330 further comprises a bypass opening 720 and a bypass door 719 to removably close the bypass opening 720, the bypass door 719 configured to move between a closed position wherein the bypass door 719 closes (e.g., at least partially closes) the bypass opening 720 and an open position wherein the bypass door 719 allows water located in the basin 121 to enter through the bypass opening 720 and enter the first opening 706. Optionally, the bypass door 719 is configured to rotate relative to the bypass opening 720. Optionally, the bypass door 719 is generally circular in shape and is configured to rotate about a pivot point 721 located in a center of the circle. In other embodiments (not shown), the bypass door 719 is configured to slide/move vertically relative to the bypass opening 720. The purpose of the bypass opening 719 and bypass door 720 is that the bypass door 720 preferably has a number of settings, the settings differing in the amount in which the bypass door 719 covers the bypass opening 720, so that the user can adjust the bypass door 719 and let varying amounts of water through the bypass opening 720 depending on the force of the pump 190). Adjusting the bypass door 719 changes the pressure level at which the vacuum release door 261 (which is normally closed) is triggered open. More particularly, it has been observed that without the bypass door 719 and bypass opening 720, stronger pumps 190 (as well as pumps that are not drawing water from the main drain 101) are more apt to trigger the vacuum release door 261 to open than weaker pumps 190. This can be problematic as the vacuum release door 261 is designed as an emergency measure, like an electric breaker, to protect the pump 190 from drawing air when the additional weir 230 is too high, and the vacuum release door 261 is designed to be normally closed. However, by uncovering the bypass opening 720 in these stronger pumps 190, water is able to enter through the bypass opening 720 and a greater amount of water pressure is required to cause the vacuum release door 261 to open. Like the vacuum release door 261, the bypass opening 720 is normally in the bottom half 650 of the deflector 330 to ensure that the bypass opening 720 is under water. Unlike the vacuum release door 261, which is normally closed and is triggered open by high pressure, the bypass door 719 is a dial door that is adjusted by a user depending on his/her pump 190 and is always kept in the same position.

The deflector 330 can be attached, directly or indirectly, to the pool sidewall 120 by any acceptable method. For example, a nut 729 may be screwed onto the pipe/tube 722 extending from the deflector 330 and a frame 400, with an aperture 728 receiving the pipe/tube 722, may be located between the nut 729 and the skimmer opening 135. In such a case, the frame 400 is prevented from moving rearwardly by the nut 729 and the frame 400 is prevented from moving forward due to the flanges 198 located in the skimmer interior 700. For example, the Hayward model SP1070 skimmer (Hayward Industries, Elizabeth N.J.) has flanges 198 on the top and the bottom in the location where the skimmer weir 170 is normally located and in such skimmers, the skimmer weir 170 is removed and the top and bottom flanges 198 prevent the frame 400 from moving forward. In other embodiments, the deflector 330 and/or plate 709 may be screwed to the faceplate 135 in the case of a vinyl pool or an adjustable frame 400 located inside the throat 196 as described in the prior embodiments. Optionally, the deflector 330 further comprises a substantially water impermeable floor 340 such that, for example, approximately 95% of the surface area of the floor 340 is not permeable to water, it being understood that the bypass door 719 and opening 720 may be located on the floor 340. Optionally, the top of the deflector comprises a top aperture 350 allowing water to also enter the deflector interior 705 through the top aperture 350. Optionally, the pool skimmer 100 further comprises a skimmer weir 170 located inside the pool skimmer interior 700 and the skimmer weir 170 is immobilized. Optionally, the pool skimmer 100 does not have a skimmer weir 170 in the skimmer interior 700. Optionally, the skimmer interior 700 further comprises a skimmer basket 160. Optionally, the system further comprises a pump 190 in fluid communication with the basin 121 and the skimmer interior 700. Optionally, the deflector 330 further comprises a removable large debris door 731, which slides into the deflector 330 via tracks (not shown), and covers a large debris opening 732. The function of the large debris door 731 and opening 732 is that the large debris door 731 normally covers the large debris opening 732 but the large debris door 731 can be removed for example in the fall months so that large leaves and other debris can enter into the deflector interior 705 given that the large debris door 731 has a width that is typically larger than the width 707 of the second opening 320. Optionally, the median width of the large debris door 731 is from about 3 inches to about 8 inches and the large debris door has a height of approximately 3 inches to about 12 inches. In some embodiments, the deflector 330 described directly above is provided as a kit that attaches to the sidewall 120 and/or skimmer 100 and includes one or more features, including but not limited to the additional weir 230, tracks 210, wheels 627/628, vacuum release door 261, vacuum release opening 260, bypass door 719, bypass opening 720, large debris door 731, large debris opening 732, and pipe 722.

In some embodiments, the present disclosure provides a method of using a system to increase the range of a pool skimmer that includes a) providing the system described above; and b) flowing water from the basin 121, through the second opening 320, through the deflector interior 705, through the first opening 706, through the skimmer opening 135, and into the skimmer interior 700.

As described above, it has been found that wheels 627/628 are particularly useful for moving the additional weir 230 to reduce friction. Thus, in some embodiments, the present disclosure provides a pool skimmer system comprising:

a) a swimming pool 100 comprising a basin 121 configured to hold water and a plurality of sidewalls 120 defining a perimeter of the basin 121;

b) a pool skimmer 100 comprising a skimmer opening 135 located in one of the sidewalls 120 and a skimmer interior 700;

c) two tracks 210 located in the pool basin 121; and d) an additional weir 230 located in the pool basin 121, the additional weir 230 configured to move upwards and downwards and regulate water entering the skimmer opening 135, the additional weir 230 having two opposite sides, each of the opposite sides having at least one wheel 627/628 attached thereto, each of the wheels 627/628 received in a track 210.

Optionally, the tracks 210 are curved and the additional weir 230 is configured to move in an arc upwards and downwards in response to changing water levels in the pool basin 121.

In other embodiments, the additional weir 230 with attached wheels 627/628 is located inside the skimmer interior 700. In such embodiments, the present disclosure provides a pool skimmer system comprising:

a) a swimming pool 100 comprising a basin 121 configured to hold water and a plurality of sidewalls 120 defining a perimeter of the basin 121;

b) a pool skimmer 100 comprising a skimmer opening 135 located in one of the sidewalls 120 and a skimmer interior 700;

c) two tracks 210 located in the skimmer interior 700; and d) a weir 170 located the skimmer interior 700, the weir 170 configured to move upwards and downwards in response to changing water levels in the basin 121, the weir 170 having two opposite sides, each of the opposite sides having at least one wheel 627/628 attached thereto, each of the wheels 627/628 received in a track 210.

Optionally, in either of these embodiments described directly above, the skimmer interior 700 further comprises a skimmer basket 160. Optionally, the system further comprises a pump 190 in fluid communication with the basin 121 and the skimmer interior 700. In addition to these features, the system may have any of the features described above with respect to FIGS. 25-32, including without limitation, the vacuum release door 261 and opening 260, the bypass opening 720 and door 719, the attachment mechanisms described above, the float 714, the tab 713, etc. In addition, the tracks 210 may be vertical or in the shape of an arc as described above.

The Embodiment of FIGS. 33-35

As shown in FIGS. 33-35, in some embodiments, the present disclosure provides a new design of a pool skimmer 100 that allows the skimmer opening 135 to be very close to the top of the sidewall 120 and the top of the concrete surrounding the pool 120. This allows the pool owner to skim effectively when the pool 110 is filled with water to the top of the sidewall 120. In some embodiments, the new skimmer 100 has a) a front end 600 comprising a top 601, a bottom 602, and a skimmer opening 135 leading to the skimmer interior 700 and comprising a top 605, a bottom 606, a left side 604, a right side 603, a width 608 extending from the skimmer opening left side 604 to the skimmer opening right side 603 of at least about 2 inches and a height 607 extending from the skimmer opening top 605 to the skimmer opening bottom 606 of from about 2 inches to about 16 inches;

b) a rear end 610 comprising a top 611 comprising a top opening 612, a lid 613 configured to removably close the top opening 612, a bottom 614 comprising a bottom opening 199 in fluid communication with the skimmer opening 135, a well 616 located directly below the top opening 612, the bottom opening 199 extending into the well 616, a skimmer basket 160 located in the well 616 and comprising a floor 617, a sidewall 618 extending from the floor 617, at least one of the floor 617 and the basket sidewall 618 comprising a plurality of apertures configured to allow water to flow from the basket 160 to the bottom opening 199 and ultimately the pump 190; and c) a middle portion 620 located between the front end 600 and the rear end 610 and comprising a top 621, a bottom 622, a height extending from the top 621 to the bottom 622 and a throat 196 in fluid communication with the skimmer opening and the rear end 610, wherein the top 601 of the front end 600, the top 611 of the rear end 610, and the top 621 of the middle portion 620 are within about 1 inch of each other when the top 601 of the front end 600, the top 611 of the rear end 610, and the top 621 of the middle portion 620 are positioned parallel to the ground. Optionally, the top 601 of the front end 600, the top 611 of the rear end 610, and the top 621 of the middle portion 620 are within about 0.5 inches of each other (i.e., 0 to about 0.5 inches) when the top 601 of the front end 600, the top 611 of the rear end 610, and the top 621 of the middle portion 620 are positioned parallel to the ground. In other words, preferably, the top 601 of the front end 600, the top 611 of the rear end 610, and the top 621 of the middle portion 620 are co-planar. More particularly, the top 611 of the rear end 610 (more particularly the top of the lid 613), the top 621 of the middle portion 620 and the top 601 of the front end 600 are substantially level so that no concrete is placed on top of the rear end 610, on top of the middle portion 620 and on top of the front end 600 after positioning the skimmer 100 in the sidewall 120. Rather, users are able to walk on the top 611 of the rear end 610, the top 621 of the middle portion 620 and the top 601 of the front end 600, just as users now walk on the top of the lid 613. (It will be appreciated that concrete is typically poured over the middle portion 620 and front portions 600 of typical prior art skimmers, as shown in FIG. 2)

In some embodiments, the throat 196 extends substantially to the top 621 of the middle portion 620. Optionally, the top 611 of the rear end 610, the top 621 of the middle portion 620 and the top 601 of the front end 600, are comprised of plastic. Optionally, the lid 613 is generally circular.

Optionally, the height 607 of the skimmer opening 135 is from about 8 inches to about 14 inches. Optionally, the width 608 of the skimmer opening 135 is between about 3 and about 6 inches. Optionally, the pool skimmer 100 further includes a weir configured to move upwards and downwards in response to changing water levels in the basin 121. In some embodiments, similar to FIGS. 4-10, the weir is an external weir 230 and located exterior to the skimmer interior 700 and skimmer opening 135. In other embodiments, the weir is an internal weir 170 located in the skimmer interior 700 and configured to move upwards and downwards in response to changing water levels in the skimmer interior 700. Optionally, the weir 230/170 is located adjacent to the skimmer opening 135 (e.g., about 0 to about 6 inches from the opening 135). Optionally, similar to the above embodiments, the skimmer 100 comprises a left track and a right track (not shown in FIGS. 33-35) and the weir 230/170 is configured is configured to move along the left and right tracks. Optionally, similar to the embodiment of FIGS. 25-32, the weir 230/170 further comprises at least one left wheel located in the left track and at least one right wheel located in the right track (not shown in FIGS. 33-35). Optionally, the weir 230/170 further comprises a float 714. Optionally, the float 714 comprises foam. Optionally, the weir 230/170 is attached to the skimmer 100 via a hinge 155 and is configured to pivot between a horizontal position in which the weir 230/170 is parallel to the lid 613 and a vertical position in which the weir 230/170 is perpendicular to the lid 613. Optionally, similar to the above embodiments, the weir 230/170 further comprises a vacuum release door and a vacuum release opening (not shown in FIGS. 33-35), the vacuum release door configured to move between a closed position wherein the vacuum release door closes the vacuum release opening and an open position wherein the vacuum release door allows water to enter through the vacuum release opening. Optionally, similar to the above embodiments, the weir 230/170 further comprises a hinge attaching the vacuum release door to the weir 230/170 and further wherein the vacuum release door is moveable along the hinge. Optionally, similar to the above embodiments, the weir 230/170 comprises a tab located exterior to the vacuum release door, the tab configured to prevent the vacuum release door from rotating beyond the tab. Optionally, similar to the above embodiments, the weir 230/170 comprises a top half and a bottom half and the vacuum release opening is located in the bottom half of the weir 230/170. Optionally, the throat 196 has a length of from about 3 inches to about 12 inches. Optionally, the throat 196 is generally rectangular in shape. Optionally, as shown in FIGS. 34 and 35, the skimmer 100 is generally in the shape of an upside down "L" with the top 611 of the rear end 610, the top 621 of the middle portion 620, and the top 601 of the front end 600 forming the horizontal portion of the "L" and the rear end 610 forming the vertical portion of the "L" it being understood that the rear end 610 may taper in width, as shown in FIGS. 34 and 35.

Terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. In addition, use of the singular form of a term embraces the plural.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention, as defined and limited solely by the following claims.

What is claimed is:

1. A system for improving the range of a pool skimmer, the system comprising:
   a) a swimming pool comprising a basin configured to hold water and a plurality of sidewalls defining a perimeter of the basin;
   b) a pool skimmer, the pool skimmer comprising a skimmer opening located in one of the sidewalls and a skimmer interior;
   c) a deflector adjacent to the sidewall comprising the skimmer opening and extending into the basin, the deflector having a rear facing the skimmer opening and comprising a first opening in fluid communication with the skimmer and configured to feed water through the skimmer opening, a front opposite the rear, a left side, a right side, and an interior defined by the front, the rear, and the left and right sides, at least one of the front, the left side and the right side comprising an arc-shaped second opening configured to deliver water from the pool basin to the deflector interior and the first opening, the second opening having a median width of at least about 1 inch and a height of at least about 1 inch; and
   d) an arc-shaped weir configured to at least partially cover the second opening, the weir comprising a top, a bottom, and a height extending from the top to the bottom, the weir curved along its height, the weir configured to move upwards and downwards along an arc in response to changing water levels in the pool basin.

2. The system of claim 1, wherein the second opening has a height of from about 4 inches to about 12 inches and a median width of from about 1 inch about 6 inches.

3. The system of claim 1, wherein the second opening extends above the skimmer opening.

4. The system of claim 1, wherein the deflector further comprises at least one arc-shaped track adjacent to the second opening and further wherein the weir is configured to move along the track.

5. The system of claim 1, wherein the weir is buoyant in water.

6. The system of claim 1, wherein the weir comprises a tab extending from the top, and a float.

7. The system of claim 6, wherein the float is attached to the tab.

8. The system of claim 6, wherein the float comprises foam.

9. The system of claim 1, wherein the deflector further comprises a vacuum release door and a vacuum release opening, the vacuum release door configured to move between a closed position wherein the vacuum release door closes the vacuum release opening and an open position wherein the vacuum release door allows water located in the basin to enter through the vacuum release opening and enter the deflector interior and the first opening.

10. The system of claim 9, wherein moving the weir above the water level of water located in the pool basin causes the vacuum release door to move from the closed position to the open position and further wherein the deflector comprises a top half and a bottom half and the vacuum release opening is located in the bottom half of the deflector.

11. The system of claim 1, wherein the deflector further comprises a bypass opening and a bypass door to removably close the bypass opening, the bypass door configured to move between a closed position wherein the bypass door closes the bypass opening and an open position wherein the bypass door allows water located in the basin to enter through the bypass opening and enter the first opening.

12. The system of claim 11 wherein the bypass door is configured to rotate relative to the bypass opening.

13. The system of claim 11 wherein the bypass door is generally circular in shape and is configured to rotate about a pivot point located in a center of the circle.

14. The system of claim 11, wherein the bypass door has a variety of settings, the settings varying by the degree in which the bypass door closes the bypass opening.

15. The system of claim 1, wherein the system comprises a tube extending from the deflector rear and adjacent to the first opening, the tube having a front end attached to the deflector rear, a rear end, a hollow interior in fluid communication with the first opening, and a wall.

16. The system of claim 1, wherein the deflector further comprises a substantially water impermeable floor.

17. The system of claim 1, wherein the deflector further comprises a top, the top comprising a top aperture.

18. The system of claim 1, wherein the system further comprises a large debris door having a median width of from about 3 inches to about 8 inches and a height of approximately 3 inches to about 12 inches.

19. A method of using a system to increase the range of a pool skimmer, the method comprising:
   a) providing the system of claim 1; and
   b) flowing water from the basin, through the second opening, through the deflector interior, through the first opening, through the skimmer opening, and into the skimmer interior.

* * * * *